United States Patent
Li et al.

(10) Patent No.: US 10,826,794 B2
(45) Date of Patent: Nov. 3, 2020

(54) METHOD AND SYSTEM FOR MANAGING QUALITY OF SERVICE IN WIRELESS COMMUNICATIONS SYSTEM

(71) Applicant: Huawei Technologies Co., Ltd., Shenzhen, Guangdong (CN)

(72) Inventors: Hong Li, Shanghai (CN); Yinghao Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/265,452

(22) Filed: Feb. 1, 2019

(65) Prior Publication Data
US 2019/0166014 A1 May 30, 2019

Related U.S. Application Data

(63) Continuation of application No. PCT/CN2017/097410, filed on Aug. 14, 2017.

(30) Foreign Application Priority Data

Aug. 12, 2016 (CN) .......................... 2016 1 0670144

(51) Int. Cl.
*H04L 12/24* (2006.01)
*H04W 28/02* (2009.01)
(Continued)

(52) U.S. Cl.
CPC .......... *H04L 41/5003* (2013.01); *H04L 41/08* (2013.01); *H04L 41/0813* (2013.01);
(Continued)

(58) Field of Classification Search
CPC . H04L 41/08; H04L 41/0813; H04L 41/5003; H04L 43/026; H04L 43/0882;
(Continued)

(56) References Cited

U.S. PATENT DOCUMENTS 9,591,516 B2 * 3/2017 Tjandra ............ H04W 28/0263
2008/0279139 A1 11/2008 Beziot et al.
(Continued)

FOREIGN PATENT DOCUMENTS

CN 101132613 A 2/2008
CN 101998304 A 3/2011
(Continued)

OTHER PUBLICATIONS

NGMN, "NGMN 5G White Paper," Next Generation Mobile Network Alliance, White Paper, 2015, 125 pages.
(Continued)

*Primary Examiner* — Mewale A Ambaye
(74) *Attorney, Agent, or Firm* — Slater Matsil, LLP

(57) ABSTRACT

The present disclosure discloses a method and an apparatus for managing quality of service in a wireless communications system. A radio access network device receives service data through n bearers between a core network device and the radio access network device, where the service data includes a plurality of service flows mapped to the n bearers, and n is an integer greater than or equal to 1. The radio access network device performs flow demapping of the received service data according to a QoS rule, to obtain the plurality of service flows. The radio access network device maps, according to the QoS rule, at least some of the plurality of service flows obtained through the flow demapping to t bearers between the radio access network device and a user equipment for transmission, where t is an integer greater than or equal to 1.

16 Claims, 16 Drawing Sheets

(51) Int. Cl.
*H04L 12/26* (2006.01)
*H04W 88/02* (2009.01)

(52) U.S. Cl.
CPC ........ *H04L 43/026* (2013.01); *H04L 43/0882* (2013.01); *H04W 28/0268* (2013.01); *H04W 88/02* (2013.01)

(58) Field of Classification Search
CPC ............... H04L 28/0268; H04L 88/02; H04W 28/0268; H04W 88/02
See application file for complete search history.

(56) References Cited

U.S. PATENT DOCUMENTS

| | | | |
|---|---|---|---|
| 2011/0235514 A1 | 9/2011 | Huang et al. | |
| 2013/0322366 A1* | 12/2013 | Racz | H04W 28/0268 370/329 |
| 2014/0029536 A1* | 1/2014 | Tian | H04W 72/087 370/329 |
| 2016/0183119 A1* | 6/2016 | Tjandra | H04W 72/085 370/329 |
| 2018/0062819 A1 | 3/2018 | Horn et al. | |
| 2018/0324631 A1* | 11/2018 | Jheng | H04W 36/0022 |
| 2019/0150022 A1* | 5/2019 | Na | H04W 28/10 370/329 |
| 2019/0394680 A1* | 12/2019 | Yu | H04W 76/34 |
| 2020/0187044 A1* | 6/2020 | Jiang | H04L 29/06 |

FOREIGN PATENT DOCUMENTS

| | | |
|---|---|---|
| CN | 102625377 A | 8/2012 |
| EP | 2672752 A1 | 12/2013 |
| EP | 3017627 A1 | 5/2016 |
| WO | 2013112084 A1 | 8/2013 |

OTHER PUBLICATIONS

"3rd Generation Partnership Project;Technical Specification Group Services and System Aspects;Study on Architecture for Next Generation System (Release 14)," 3GPP TR 23.799 V0.7.0 (Aug. 2016), 323 pages.

* cited by examiner

METHOD AND SYSTEM FOR MANAGING QUALITY OF SERVICE IN WIRELESS COMMUNICATIONS SYSTEM

CROSS-REFERENCE TO RELATED APPLICATIONS

This application is a continuation of International Application No. PCT/CN2017/097410, filed on Aug. 14, 2017, which claims priority to Chinese Patent Application No. 201610670144.7, filed on Aug. 12, 2016. The disclosures of the aforementioned applications are hereby incorporated by reference in their entireties.

TECHNICAL FIELD

This application relates to the field of wireless network communication, and in particular, to a method and system for managing quality of service in a wireless communications system.

BACKGROUND

Quality of service (QoS) management in an existing LTE system implements an end-to-end QoS guarantee based on a bearer. A bearer is a logical set of one or more service data flows between a user equipment (UE) and a packet data network gateway (P-GW). Same packet forwarding processing (e.g., a scheduling policy, a queue management policy, a rate adjustment policy, or an RLC configuration) is performed on service data flows mapped to a same bearer of an evolved packet system (EPS). In the LTE system, a QoS guarantee from the P-GW to the UE may be implemented through several sections of a bearer, including an S5/S8 bearer between the P-GW and a serving gateway (S-GW), an S1 bearer between the S-GW and an evolved NodeB (eNB), and a radio bearer between the eNB and the UE. The S5/S8 bearer, the S1 bearer, and the radio bearer are collectively referred to as an EPS bearer. An attribute of the EPS bearer is provided by the P-GW. An attribute of a bearer corresponds to one set of QoS processing manner. Data in a same bearer uses a same data packet forwarding manner. In a downlink direction, the P-GW filters a service data flow by using a service flow template, and maps the service data flow onto an EPS bearer. On the S5/S8 bearer, the S1 bearer, and the radio bearer, a QoS requirement of a service is ensured by using the attribute of the EPS bearer. The existing LTE system performs QoS control of data transmission based on a granularity of a bearer. A plurality of Internet Protocol (IP) flows are mapped to one EPS bearer. The EPS bearer is a minimum unit of the QoS control. To be specific, QoS differentiation is not performed on data flows in a same EPS bearer. The radio bearer, the S1 bearer, and the S5/S8 bearer between the UE and the P-GW use a 1:1 mapping manner.

With rapid development of wireless communications technologies, services are more diversified and include a mobile broadband service supporting higher-rate experience and larger bandwidths, special communication of lower latency and high reliability, and low-cost massive machine type communication, and the like. Services of different types have more diversified QoS requirements. A method for managing QoS in the existing LTE system can hardly satisfy QoS requirements of diversified services.

SUMMARY

The present disclosure provides a method and system for managing QoS in a wireless communications system, and the method and system support independent evolution of respective QoS frameworks of a core network and a radio access network and implementation of flexible QoS management.

According to a first aspect, an embodiment of the present disclosure provides a method for managing quality of service in a wireless communications system. The method includes: receiving, by a radio access network device, service data through n bearers between a core network device and the radio access network device, where the service data includes a plurality of service flows mapped to the n bearers, and n is an integer greater than or equal to 1; performing, by the radio access network device, flow demapping of the received service data according to a QoS rule, to obtain the plurality of service flows; and mapping, by the radio access network device according to the QoS rule, at least some of the plurality of service flows obtained through the flow demapping to t bearers between the radio access network device and a user equipment for transmission, where t is an integer greater than or equal to 1.

With reference to the first aspect, in a first possible implementation of the first aspect, the radio access network device obtains the QoS rule from a radio access network QoS controller or the core network device.

With reference to the first aspect or the first possible implementation of the first aspect, in a second possible implementation of the first aspect, if some of the plurality of service flows are mapped to the t bearers for transmission, the remaining service flows are transmitted to the user equipment in a service flow manner.

With reference to the first aspect, in a third possible implementation of the first aspect, the at least some of the service flows are mapped to the t bearers evenly for transmission.

With reference to the first aspect or any possible implementation of the first aspect, in a fourth possible implementation of the first aspect, t is greater than n.

According to a second aspect, an embodiment of the present disclosure provides a radio access network device. The radio access network device includes a communications interface and a processor. The communications interface is configured to receive service data transmitted through n bearers between a core network device and the radio access network device, where the service data includes a plurality of service flows mapped to the n bearers, and n is an integer greater than or equal to 1. The processor is configured to: perform flow demapping of the received service data according to a QoS rule, to obtain the plurality of service flows; and map, according to the QoS rule, at least some of the plurality of service flows obtained through the flow demapping to t bearers between the radio access network device and a user equipment for transmission, where t is an integer greater than or equal to 1.

With reference to the second aspect, in a first possible implementation of the second aspect, the communications interface obtains the QoS rule from a radio access network QoS controller or the core network device.

With reference to the second aspect or the first possible implementation of the second aspect, in a second possible implementation of the second aspect, if some of the plurality of service flows are mapped to the t bearers for transmission, the remaining service flows are transmitted to the user equipment in a service flow manner.

With reference to the second aspect, in a third possible implementation of the second aspect, the processor maps the at least some of the service flows to the t bearers evenly for transmission.

With reference to the second aspect or any possible implementation of the second aspect, in a fourth possible implementation of the second aspect, the processor is configured to determine, according to the QoS rule, whether to send, in a bearer manner or a service flow manner, the plurality of service flows obtained through the flow demapping.

With reference to the second aspect or any possible implementation of the second aspect, in a fifth possible implementation of the second aspect, t is greater than n.

According to a third aspect, an embodiment of the present disclosure provides a method for managing quality of service in a wireless communications system. The method includes: receiving, by a radio access network device, service data through n bearers between a user equipment and the radio access network device, where the service data includes a plurality of service flows mapped to the n bearers, and n is an integer greater than or equal to 1; performing, by the radio access network device, flow demapping of the received service data according to a QoS rule, to obtain the plurality of service flows; and mapping, by the radio access network device according to the QoS rule, at least some of the plurality of service flows obtained through the flow demapping to t bearers between the radio access network device and a core network device for transmission, where t is an integer greater than or equal to 1.

With reference to the third aspect, in a first possible implementation of the third aspect, the radio access network device obtains the QoS rule from a radio access network QoS controller or the core network device.

With reference to the third aspect or the first possible implementation of the third aspect, in a second possible implementation of the third aspect, if some of the plurality of service flows are mapped to the t bearers for transmission, the remaining service flows are transmitted to the core network device in a service flow manner.

With reference to the third aspect, in a third possible implementation of the third aspect, the at least some of the service flows are mapped to the t bearers evenly for transmission.

With reference to the third aspect or any possible implementation of the third aspect, in a fourth possible implementation of the third aspect, t is greater than n.

According to a fourth aspect, an embodiment of the present disclosure provides a radio access network device. The radio access network device includes a communications interface and a processor. The communications interface is configured to receive service data transmitted through n bearers between a user equipment and the radio access network device, where the service data includes a plurality of service flows mapped to the n bearers, and n is an integer greater than or equal to 1. The processor is configured to: perform flow demapping of the received service data according to a QoS rule, to obtain the plurality of service flows; and map, according to the QoS rule, at least some of the plurality of service flows obtained through the flow demapping to t bearers between the radio access network device and a core network device for transmission, where t is an integer greater than or equal to 1.

With reference to the fourth aspect, in a first possible implementation of the fourth aspect, the communications interface obtains the QoS rule from a radio access network QoS controller or the core network device.

With reference to the fourth aspect or the first possible implementation of the fourth aspect, in a second possible implementation of the fourth aspect, if some of the plurality of service flows are mapped to the t bearers for transmission, the remaining service flows are transmitted to the core network device in a service flow manner.

With reference to the fourth aspect, in a third possible implementation of the fourth aspect, the processor maps the at least some of the service flows to the t bearers evenly for transmission.

With reference to the fourth aspect or any possible implementation of the fourth aspect, in a fourth possible implementation of the fourth aspect, the processor is configured to determine, according to the QoS rule, whether to send, in a bearer manner or a service flow manner, the plurality of service flows obtained through the flow demapping.

With reference to the fourth aspect or any possible implementation of the fourth aspect, in a fifth possible implementation of the fourth aspect, t is greater than n.

According to a fifth aspect, an embodiment of the present disclosure provides a method for managing quality of service in a wireless communications system. The method includes: receiving, by a core network device, service data through n bearers between a radio access network device and the core network device, where the service data includes a plurality of service flows mapped to the n bearers, and n is an integer greater than or equal to 1; performing, by the core network device, flow demapping of the received service data according to a QoS rule, to obtain the plurality of service flows; and mapping, by the core network device according to the QoS rule, at least some of the plurality of service flows obtained through the flow demapping to t bearers between the core network devices for transmission, where t is an integer greater than or equal to 1.

With reference to the fifth aspect, in a first possible implementation of the fifth aspect, if some of the plurality of service flows are mapped to the t bearers for transmission, the remaining service flows are transmitted between the core network devices in a service flow manner.

With reference to the fifth aspect, in a second possible implementation of the fifth aspect, the at least some of the service flows are mapped to the t bearers evenly for transmission.

With reference to the fifth aspect or any possible implementation of the fifth aspect, in a third possible implementation of the fifth aspect, t is greater than n.

According to a sixth aspect, an embodiment of the present disclosure provides a core network device, where the core network device includes a communications interface and a processor. The communications interface is configured to receive service data transmitted through n bearers between a radio access network device and the core network device, where the service data includes a plurality of service flows mapped to the n bearers, and n is an integer greater than or equal to 1. The processor is configured to: perform flow demapping of the received service data according to a QoS rule, to obtain the plurality of service flows; and map, according to the QoS rule, at least some of the plurality of service flows obtained through the flow demapping to t bearers between the core network devices for transmission, where t is an integer greater than or equal to 1.

With reference to the sixth aspect, in a first possible implementation of the sixth aspect, if some of the plurality of service flows are mapped to the t bearers for transmission, the remaining service flows are transmitted between the core network devices in a service flow manner With reference to the sixth aspect, in a second possible implementation of the sixth aspect, the processor maps the at least some of the service flows to the t bearers evenly for transmission.

With reference to the sixth aspect or any possible implementation of the sixth aspect, in a third possible implementation of the sixth aspect, the processor is configured to determine, according to the QoS rule, whether to send, in a bearer manner or a service flow manner, the plurality of service flows obtained through the flow demapping.

With reference to the sixth aspect or any possible implementation of the sixth aspect, in a fourth possible implementation of the sixth aspect, t is greater than n.

According to a seventh aspect, an embodiment of the present disclosure provides a system for managing quality of service in a wireless communications system. The system includes a core network device and a radio access network device. The core network device maps service data to n bearers for transmission to the radio access network device. The radio access network device receives the service data through the n bearers between the core network device and the radio access network device. The service data includes a plurality of service flows mapped to the n bearers, and n is an integer greater than or equal to 1. The radio access network device performs flow demapping of the received service data according to a QoS rule, to obtain the plurality of service flows. The radio access network device maps, according to the QoS rule, at least some of the plurality of service flows obtained through the flow demapping to t bearers between the radio access network device and a user equipment for transmission, where t is an integer greater than or equal to 1.

With reference to the seventh aspect, in a first possible implementation of the seventh aspect, the radio access network device obtains the QoS rule from a radio access network QoS controller or the core network device.

With reference to the seventh aspect or the first possible implementation of the seventh aspect, in a second possible implementation of the seventh aspect, if some of the plurality of service flows are mapped to the t bearers for transmission, the remaining service flows are transmitted to the user equipment in a service flow manner.

With reference to the seventh aspect, in a third possible implementation of the seventh aspect, the at least some of the service flows are mapped to the t bearers evenly for transmission.

With reference to the seventh aspect or any possible implementation of the seventh aspect, in a fourth possible implementation of the seventh aspect, t is greater than n.

According to an eighth aspect, an embodiment of the present disclosure provides a system for managing quality of service in a wireless communications system. The system includes a core network device and a radio access network device. The radio access network device receives service data through n bearers between a user equipment and the radio access network device, where the service data includes a plurality of service flows mapped to the n bearers, and n is an integer greater than or equal to 1. The radio access network device performs flow demapping of the received service data according to a QoS rule, to obtain the plurality of service flows. The radio access network device maps, according to the QoS rule, at least some of the plurality of service flows obtained through the flow demapping to t bearers between the radio access network device and the core network device for transmission, where t is an integer greater than or equal to 1.

With reference to the eighth aspect, in a first possible implementation of the eighth aspect, the radio access network device obtains the QoS rule from a radio access network QoS controller or the core network device.

With reference to the eighth aspect or the first possible implementation of the eighth aspect, in a second possible implementation of the eighth aspect, if some of the plurality of service flows are mapped to the t bearers for transmission, the remaining service flows are transmitted to the core network device in a service flow manner.

With reference to the eighth aspect, in a third possible implementation of the eighth aspect, the at least some of the service flows are mapped to the t bearers evenly for transmission.

With reference to the eighth aspect or any possible implementation of the eighth aspect, in a fourth possible implementation of the eighth aspect, t is greater than n.

With reference to the eighth aspect, in a fifth possible implementation of the eighth aspect, the core network device receives service data through the bearers between the radio access network device and the core network device, where the service data includes a plurality of service flows mapped to the t bearers, and t is an integer greater than or equal to 1; the core network device performs flow demapping of the received service data according to the QoS rule, to obtain the plurality of service flows; and the core network device maps, according to the QoS rule, at least some of the plurality of service flows obtained through the flow demapping to v bearers between the core network devices for transmission, where v is an integer greater than or equal to 1.

With reference to the eighth aspect, in a sixth possible implementation of the eighth aspect, if some of the plurality of service flows are mapped to the v bearers for transmission, the remaining service flows are transmitted between the core network devices in a service flow manner.

With reference to the fifth or sixth possible implementation of the eighth aspect, in a seventh possible implementation of the eighth aspect, the at least some of the service flows are mapped to the v bearers evenly for transmission.

With reference to the eighth aspect or any possible implementation of the eighth aspect, in an eighth possible implementation of the eighth aspect, v is greater than t.

In the embodiments of the present disclosure, the radio access network device may obtain the QoS rule from the radio access network QoS controller, perform the flow demapping of the n bearers, and then map the obtained flows to the t bearers, thereby implementing QoS control of the radio access network. Further, the radio access network may use QoS management and control different from those of the core network according to a policy of an operator and based on a network status and resource usage of the radio access network, to implement flexible mapping of a service flow to a bearer, thereby facilitating independent evolution of the core network and the radio access network.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
FIG. 1 is a schematic diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. The following several specific embodiments may be combined with each other, and a same or similar concept or process may not be described repeatedly in some embodiments. All other embodiments obtained by a person of ordinary skill in the art based on the embodiments of the present disclosure without creative efforts shall fall within the protection scope of the present disclosure.

In this application, the word "exemplary" is used to represent giving an example, an illustration, or a description. Any embodiment described as "exemplary" in this application should not be explained as being more preferred or having more advantages than another embodiment. The following descriptions are presented to enable any person skilled in the art to implement and use the present disclosure. In the following description, details are listed for the purpose of explanation. It should be understood that a person of ordinary skill in the art can realize that the present disclosure can also be implemented when these specific details are not used. In other examples, commonly known structures and processes are not described in detail, to prevent unnecessary details from making descriptions of the present disclosure obscure. Therefore, the present disclosure is not limited to the embodiments shown, but is to be accorded the widest scope consistent with the principles and features disclosed in this application.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A QoS management function, policy, and rule of an existing LTE network are all generated in a core network and are delivered to related network elements of the core network and a radio access network for enforcement. In the 3GPP technical report TR23.799 version v0.5 that is approved in Jun. 2016, a requirement that respective QoS frameworks of a core network and a radio access network need independent evolution is set down for a QoS framework of a 5G network. A QoS management mechanism of the LTE system cannot satisfy the requirement of independent evolution of the respective QoS frameworks of the core network and the radio access network. In addition, an LTE system uses QoS management that is based on an end-to-end bearer, which is difficult to satisfy the requirement of independent evolution of the respective QoS frameworks of the core network and the access network. Resources of the core network and the access network are different. The core network and the access network should be capable of implementing respective flexible QoS management functions by using different QoS control methods based on respective resource usage.

Specific embodiments are used below to describe in detail the technical solutions of the present disclosure. The following several specific embodiments may be combined with each other, and a same or similar concept or process may not be described repeatedly in some embodiments.

A method and an apparatus for managing QoS in a wireless communications system that are provided in the embodiments of the present disclosure are applicable to QoS management for different services of different UEs in the wireless communications system.

FIG. 1 is a schematic diagram of a wireless communications system according to an embodiment of the present disclosure. The wireless communications system includes UE, a radio access network (RAN) device, and a core network (CN) device. The RAN device may be a next-generation node B (gNB), a transmission reception point (TRP), a central unit (CU) device, a distributed unit (DU) device, or the like. The CN device may be a gateway, a router, a data center, a server, a network management device, or the like. The UE implements a communication service of a service flow through the RAN device and the CN device. Data transmission between the UE and the RAN device and data transmission between the RAN device and the CN device may be performed in a bearer form. A difference from 1:1 bearer mapping between network devices in an existing LTE system lies in that, different devices may implement different mapping relationships between service flows and bearers. Therefore, a same service flow may have different bearers between different network devices. FIG. 1 shows that transmission between the UE and the RAN device and transmission between the RAN device and the CN device may have different bearers. A specific implementation is described in detail in subsequent embodiments.

Figure 2:
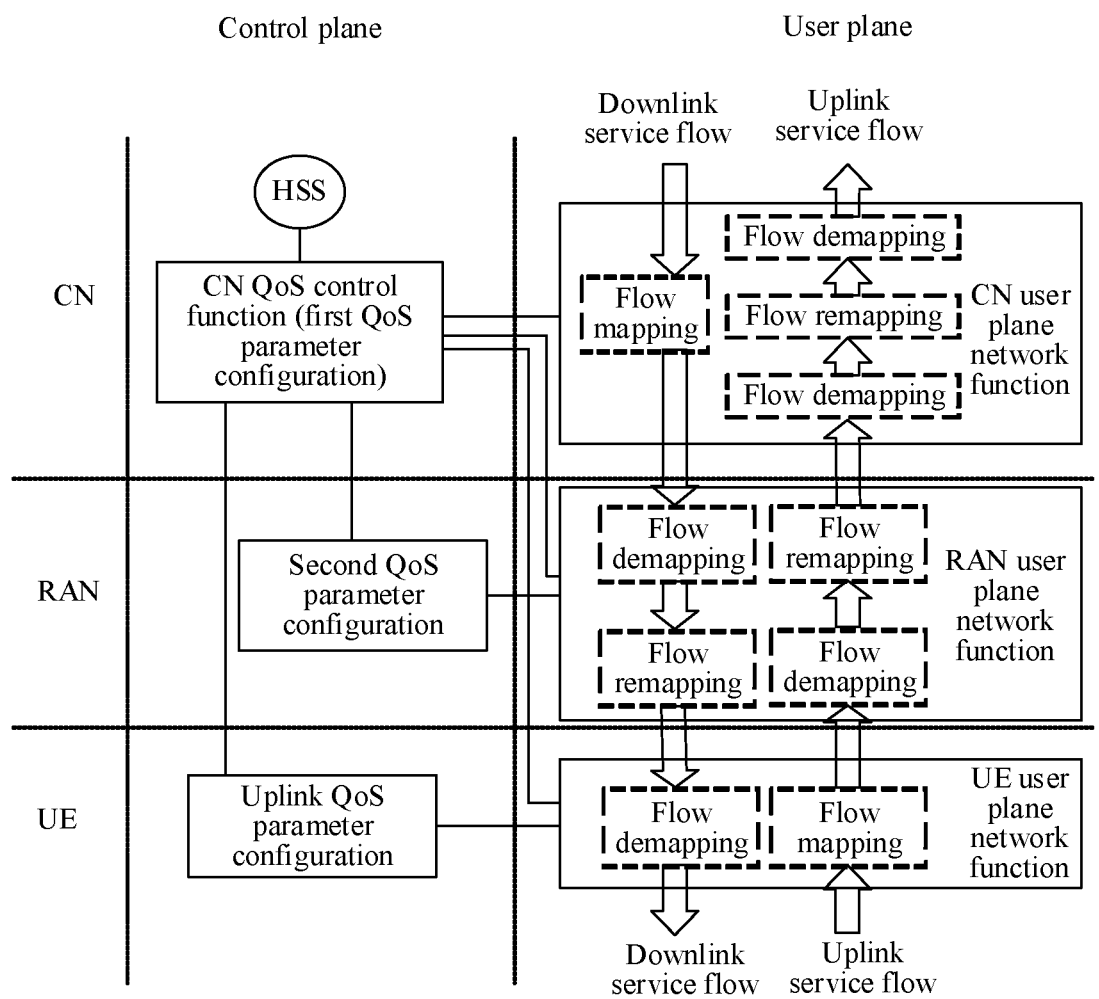
FIG. 2 is a schematic diagram of an architecture for managing and implementing QoS in a wireless communications system according to an embodiment of the present disclosure.

FIG. 2 is a schematic diagram of an architecture for managing and implementing QoS in a wireless communications system according to an embodiment of the present disclosure. A left side of FIG. 2 corresponds to a QoS management function and connections in a control plane, and a right side of FIG. 2 corresponds to a QoS enforcement function and operations in a user plane. The QoS management function may include a core network QoS control function and a first QoS parameter configuration function that are located in a CN, a second QoS parameter configuration function located in a RAN, and an uplink QoS parameter configuration function located in a UE. The QoS control function may include one or more of the following: a QoS profile obtaining function, a QoS rule creation function, a QoS rule distribution function, a QoS parameter configuration function, and the like. A QoS profile may include one or more of the following: information such as a service type, a service characteristic, a user service level, and the like. The QoS rule may be an information set generated according to a policy of an operator, an application requirement, and QoS profile information, and is used for detecting a service flow, defining a QoS parameter related to the service flow, and determining a transmission manner of the service flow. The service flow may be an IP flow and/or an IP data packet. The transmission manner of the service flow may include transmission in a service flow manner or transmission in a bearer manner. In the transmission in a service flow manner, a data packet of a service flow is transmitted according to an IP transmission protocol. In the transmission in a bearer manner, one or more service flows are mapped to one bearer for transmission. One bearer may be implemented in a data tunnel manner. For example, a GPRS Tunneling Protocol (GTP) based logical data transmission channel, or the like may be established between a source node and a destination node of data transmission. Differentiation of QoS control is not performed on all service flows in one bearer. The service flows have a same data packet forwarding processing manner, and data transmission is performed according to a transmission protocol corresponding to a transmission channel. The QoS parameter configuration function includes a service flow QoS parameter configuration function, a bearer QoS parameter configuration function, and the like, and is used for configuring a QoS parameter for a service flow or a bearer.

In the control plane of this embodiment, a function of the QoS control function in the core network is to provide a control function for end-to-end QoS management in a system. The QoS enforcement function in the user plane may include a CN user plane network function, a RAN user plane network function, and a UE user plane network function. The CN user plane network function may include functions of a data gateway, a routing and forwarding node, and the like. The RAN user plane network function may include functions of a base station, a TRP, and the like. The UE user plane network function may include a function of receiving and transmitting data of the UE, and the like.

In the control plane, the QoS control function in the core network obtains a QoS profile of a service and/or the UE from a home subscriber server (HSS), to generate a corresponding QoS rule. Transmission in a service flow manner can achieve a finer QoS control and differentiation granularity, but causes relatively high signaling overheads. One bearer is a mapping of one or more service flows, and performing transmission in a bearer manner can reduce signaling overheads. The more service flows are mapped to one bearer, the less bearers need to be established by a network, and corresponding signaling overheads are lower. However, QoS differentiation is not performed on data flows in a same bearer. Therefore, a QoS control and differentiation granularity of a bearer-based transmission manner is relatively large. In addition, the QoS rule further includes QoS requirement information of a service flow, a manner of mapping a service flow to a bearer, and the like. The CN QoS control function delivers the QoS rule to each QoS enforcement function in the user plane, and each QoS enforcement function in the user plane performs data transmission according to the corresponding QoS rule. In addition, the CN QoS control function delivers the QoS rule to the first QoS parameter configuration function in the CN, the second QoS parameter configuration function in the RAN, and the uplink QoS parameter configuration function in the UE, for determining parameter configurations of service flows and/or bearers in uplink and/or downlink directions of the CN, the RAN, and the UE, thereby ensuring QoS of uplink and downlink data transmission.

In the user plane, each network function in the user plane determines a corresponding service flow transmission manner and mapping manner, and the like according to the QoS rule received from a QoS controller, and obtains a parameter configuration from the corresponding QoS parameter configuration function, to ensure QoS of data transmission. The CN user plane network function and the UE user plane network function may perform an operation of flow mapping. The flow mapping is mapping one or more service flows having same or similar QoS to one bearer. Each bearer corresponds to one set of QoS parameters. The QoS parameters may include a QoS class identifier (QCI), a maximum bit rate (MBR), an allocation and retention priority (ARP), and the like of a service, and are used for identifying a manner of processing data on a bearer in a network. Data on a same bearer uses a same data forwarding processing manner. The CN user plane network function and the UE user plane network function may map a plurality of service flows having different QoS to a plurality of bearers. The CN user plane network function, the RAN user plane network function, and the UE user plane network function may perform an operation of flow demapping. The flow demapping is a reverse process of the flow mapping. That is, the flow demapping is performed on data on a bearer, so that the data on the bearer is restored into different service flows. The CN user plane network function and the RAN user plane network function may further perform an operation of flow remapping. When the flow demapping exists, the flow remapping is remapping a service flow obtained through the flow demapping to a bearer. For example, the flow mapping is mapping a plurality of service flows to a first bearer. Correspondingly, the flow demapping is demapping the first bearer, and restoring the first bearer into the plurality of service flows. Correspondingly, the flow remapping is further mapping the plurality of restored service flows to a second bearer. In an example, the second bearer may be different from the first bearer. In other examples, the second bearer may include one or more bearers, and the one or more bearers may be different from the first bearer. When the flow demapping does not exist, the flow remapping is equivalent to the flow mapping. For example, the flow mapping is mapping a plurality of service flows to the first bearer. Correspondingly, the flow remapping is equivalent to transmitting the first bearer. It should be noted that processes of the flow mapping, the flow demapping, and the flow remapping are all optional operations. Each user plane network function determines, according to the obtained QoS rule, whether to perform a corresponding operation.

Figure 3:
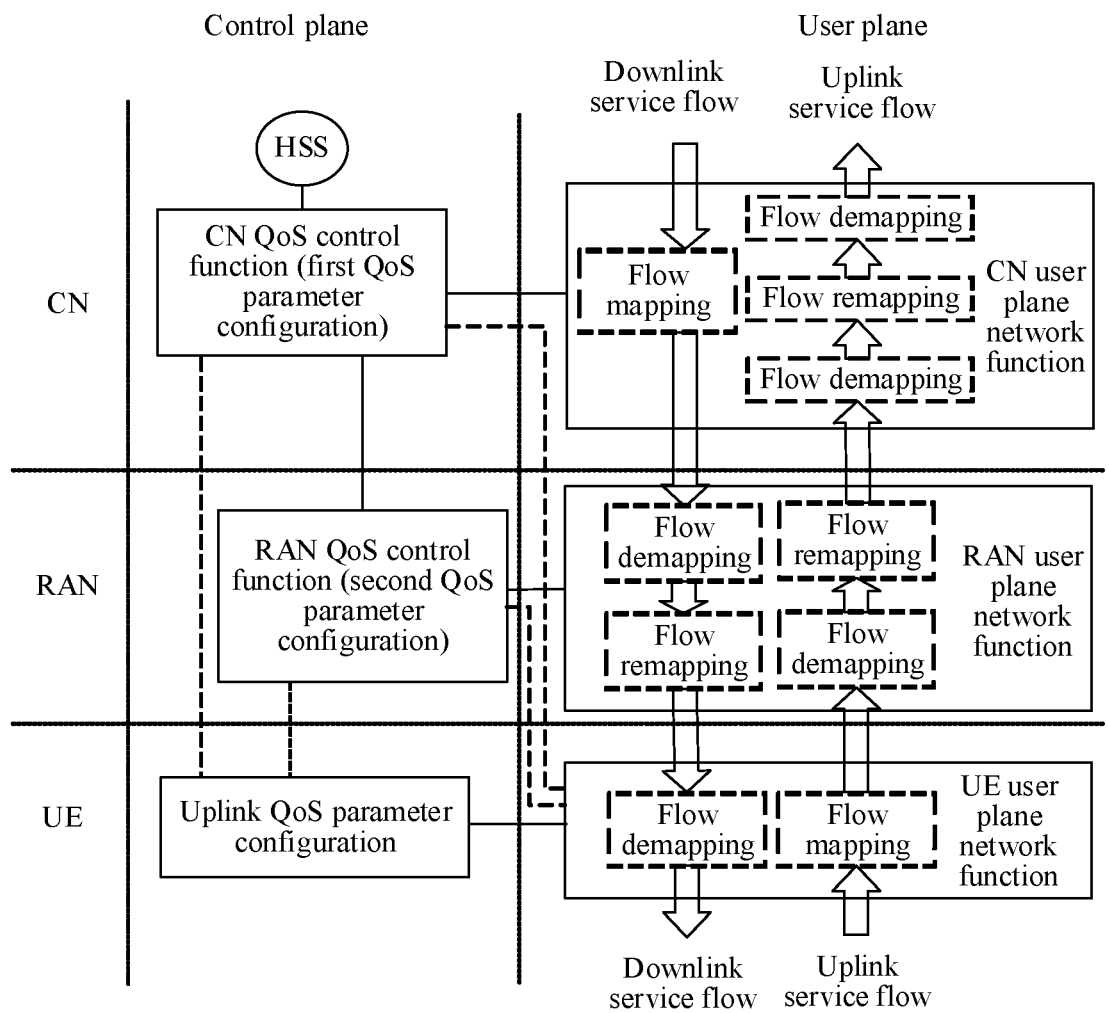
FIG. 3 is a schematic diagram of an architecture for managing and implementing QoS in a wireless communications system according to another embodiment of the present disclosure.

FIG. 3 is a schematic diagram of an architecture for managing and implementing QoS in a wireless communications system according to another embodiment of the present disclosure. As compared with the embodiment in FIG. 1, a RAN has an independent QoS control function in a control plane. A RAN user plane network function receives a QoS rule delivered by the RAN QoS control function for data transmission, and a second QoS parameter configuration function obtains the QoS rule from the RAN QoS control function. In this embodiment, a CN makes a clear and unified QoS requirement according to an application requirement, and a RAN QoS control function and a CN QoS control function cooperate to fulfill a QoS guarantee of a service. However, when the QoS requirement is satisfied, the RAN and the CN may implement independent control on a service flow transmission manner and a bearer manner in different management and implementation manners according to a policy of an operator and respective network statuses and resource usage. For example, in some implementations, the CN may map a service flow to a bearer by using a template of an IP 7-tuple (a source IP address, a destination IP address, a protocol number, a source port, a destination port, a type of service, and an interface index) of the service flow according to a QoS rule of the core network. The RAN may map a service flow to a bearer by using a template of an IP 5-tuple (a source IP address, a destination IP address, a protocol number, a source port, and a destination port) of the service flow according to the QoS rule of the radio access network. In this case, bearers to which a same service flow is mapped in the CN and in the RAN may be different. In some other implementations, the CN may map a plurality of service flows having similar service attributes and QoS requirements to one bearer according to the QoS rule of the core network. The bearer has one QoS attribute. The RAN may map the plurality of service flows to two different bearers according to the QoS rule of the radio access network. The two bearers have respective QoS attributes. In this case, a network may provide different QoS guarantees for service flows of different bearers. In addition, an operator may perform network pre-configuration according to a policy. The CN QoS control function or the RAN QoS control function delivers the QoS rule to an uplink QoS parameter configuration function of UE, to determine parameter configurations of service flows and/or bearers in an uplink direction of the UE.

In particular, when it is ensured that the RAN satisfies QoS of a service flow, the RAN may flexibly implement mapping of the service flow to a bearer based on a QoS parameter of the service flow and an RRM policy of the RAN. For example, a plurality of service flows having same QoS are mapped to one bearer. There may be a plurality of manners of mapping a service flow to a bearer. For example, a first manner is a 1:1 mapping of a service flow to a bearer. The first manner has a relationship similar to that between an EPS bearer and a radio bearer in LTE. A RAN node needs to establish a dedicated radio bearer for a service flow based on a QoS parameter of the service flow received from the CN. In this case, an RRC configuration of a radio bearer including PDCP/RLC/LCH is for each service flow. A second manner is an n:1 mapping of a service flow to a bearer, where n is an integer greater than 1. In the second manner, service flows having same or similar QoS may be aggregated on one radio bearer. The radio bearer provides a same data forwarding processing manner for the service flows on the bearer. In this case, a RRC configuration of PDCP/RLC/LCH is for each radio bearer. For example, all service flows with non-guaranteed bit rates in one session may be mapped to one common radio bearer, to avoid high costs for dedicated bearer management. This may be performed in particular to a service whose life cycle is very short and whose QoS may be indicated by a user plane label in an encapsulation header. If service flows having similar QoS are mapped to one radio bearer, different service flows in one radio bearer need to be differentiated, to implement QoS management with a finer granularity. For example, differentiation of all service flows with non-guaranteed bit rates in one common radio bearer is required for implementing QoS management with a finer granularity in the RAN. A third manner is a 1:n mapping of a service flow to a bearer, where n is an integer greater than 1. In the third manner, for example, different data packets of one IP flow may have different QoS requirements based on a content type. For QoS differentiation in one service flow, one service flow may be mapped to a plurality of radio bearers.

As compared with the embodiment in FIG. 2, the RAN in this embodiment has a QoS management function of the RAN, and independently manages and controls data transmission of a user plane of the RAN, so as to improve flexibility of QoS management for a service in a wireless communications network, and provide a possibility of independent evolution of respective QoS frameworks of the CN and the RAN.

Figure 4:
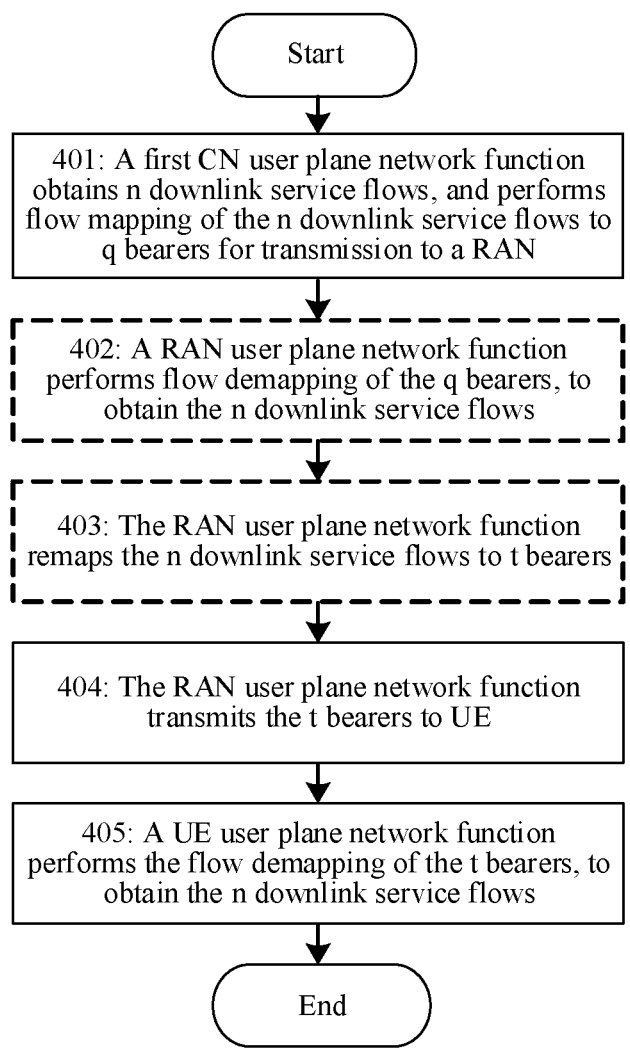
FIG. 4 is a schematic flowchart of a method for managing QoS of downlink transmission in a wireless communications system according to an embodiment of the present disclosure.

FIG. 4 is a schematic flowchart of an embodiment of a method for managing QoS of downlink transmission in a wireless communications system according to the present disclosure. In this embodiment, a downlink service flow is transmitted from a PDN network to a UE. On one hand, when a QoS control function exists only in a CN, a CN user plane network function and a RAN user plane network function implement, according to a QoS rule delivered by the CN QoS control function, that a service flow is transmitted in a bearer manner in the CN, between the CN and a RAN, in the RAN, and between the RAN and the UE. On the other hand, when QoS control functions exist in the CN and the RAN, the CN user plane network function implements, according to the QoS rule delivered by the CN QoS control function, and the RAN user plane network function implements, according to a QoS rule delivered by the RAN QoS control function, respectively, that a service flow is transmitted in a bearer manner in the CN, between the CN and the RAN, in the RAN, and between the RAN and the UE. In addition, the CN user plane network function performs parameter configuration on a bearer in the CN and a bearer between the CN and the RAN based on a first QoS parameter configuration, and the RAN user plane network function performs parameter configuration on a bearer in the RAN and a bearer between the RAN and the UE based on a second QoS parameter configuration. As shown in FIG. 4, the method includes the following steps.

401: A first CN user plane network function obtains n downlink service flows, and performs flow mapping of the n downlink service flows to q bearers for transmission to a RAN.

n and q are both integers greater than or equal to 1. The first CN user plane network function is a user plane network function of a connection between an external PDN and a CN, and is, for example, a PDN gateway function.

In this embodiment of the present disclosure, the first CN user plane network function obtains the n downlink service flows from the external PDN or an application server, and then performs flow mapping of the n downlink service flows to the q bearers according to the QoS rule sent by the CN QoS control function, and transmits in the CN and between the CN and the RAN. The n downlink service flows are service data transmitted from the PDN network to the UE. The q bearers may be forwarded by one or more CN user plane network functions in the CN. According to the QoS rule, the CN user plane network function may map the n downlink service flows to the q bearers evenly, or map the n downlink service flows to the q bearers unevenly. For example, if n is equal to q, a one-to-one mapping of a service flow to a bearer is implemented; if n is greater than q, a many-to-one mapping of a service flow to a bearer is implemented; and if n is less than q, a one-to-many mapping of a service flow to a bearer is implemented. In addition, the CN user plane network function performs parameter configuration on the q bearers based on first QoS parameter configuration information, to ensure QoS of each bearer.

402: A RAN user plane network function performs flow demapping of the q bearers, to obtain the n downlink service flows.

The flow demapping is a reverse process of the flow mapping in step 401.

403: The RAN user plane network function remaps the n downlink service flows to t bearers.

t is an integer greater than or equal to 1.

In this embodiment of the present disclosure, the RAN user plane network function remaps, according to the QoS rule sent by the CN QoS control function or the RAN QoS control function, the n downlink service flows obtained through the flow demapping to the t bearers. According to the QoS rule, the RAN user plane network function may map the n downlink service flows to the t bearers evenly, or map the n downlink service flows to the t bearers unevenly. For example, if n is equal to t, a one-to-one mapping of a service flow to a bearer is implemented; if n is greater than t, a many-to-one mapping of a service flow to a bearer is implemented; and if n is less than t, a one-to-many mapping of a service flow to a bearer is implemented.

404: The RAN user plane network function transmits the t bearers to UE.

In this embodiment of the present disclosure, the RAN user plane network function transmits the t bearers in the RAN and between the RAN and the UE. The t bearers may be forwarded by one or more RAN user plane network functions in the RAN. In addition, the RAN user plane network function performs parameter configuration on the t bearers based on second QoS parameter configuration information, to ensure QoS of each bearer.

405: A UE user plane network function performs the flow demapping of the t bearers, to obtain the n downlink service flows.

In this embodiment of the present disclosure, on one hand, when the QoS control function exists only in the CN, the UE user plane network function performs, according to the QoS rule sent by the CN QoS control function, the flow demapping of the received t bearers to the n downlink service flows. On the other hand, when the QoS control functions exist in the CN and the RAN, the UE user plane network function performs, according to the QoS rule sent by the CN QoS control function or the RAN QoS control function, the flow demapping of the received t bearers to the n downlink service flows.

In the embodiment in FIG. 4, the CN and the RAN may implement different bearer mapping manners, namely, a mapping between a service flow and a bearer, based on respective network resource usage. On one hand, when the QoS control function exists only in the CN, the RAN may report resource usage of the RAN to the CN, and the CN QoS control function determines respective bearer mapping manners of the CN and the RAN. On the other hand, when the QoS control functions exist in the CN and the RAN, the CN and the RAN may determine respective bearer mapping manners respectively based on network resource usage of the CN and the RAN. In this embodiment, bearers to which the n downlink service flows are mapped in the CN and bearers to which the n downlink service flows are mapped in the RAN may be independent of each other. For example, four downlink service flows are transmitted from the PDN network to the UE, and the CN user plane network function maps first and second service flows to a first bearer in the CN, and maps third and fourth service flows to a second bearer in the CN. That is, q=2. In some implementations, the RAN user plane network function performs the flow demapping of the received first and second bearers, and then performs flow remapping of all the service flows to a first bearer on the RAN. That is, t=1. In this case, quantities of the bearers to which the service flows are mapped in the CN and in the RAN are different. In some other implementations, the RAN user plane network function maps the first and third service flows obtained through the flow demapping to a first bearer in the RAN, and maps the second and fourth service flows to a second bearer in the RAN. That is, t=2. In this case, although t=q, bearer mapping manners of the service flows in the CN and in the RAN are different. In some other implementations, the RAN user plane network function uses a bearer mapping manner the same as that of the CN user plane network function, and maps the first and second service flows obtained through the flow demapping to the first bearer in the RAN, and maps the third and fourth service flows to the second bearer in the RAN. In this case, t=q, and bearer mapping manners of the CN and the RAN are the same. Steps 402 and 403 may be omitted.

Figure 5:
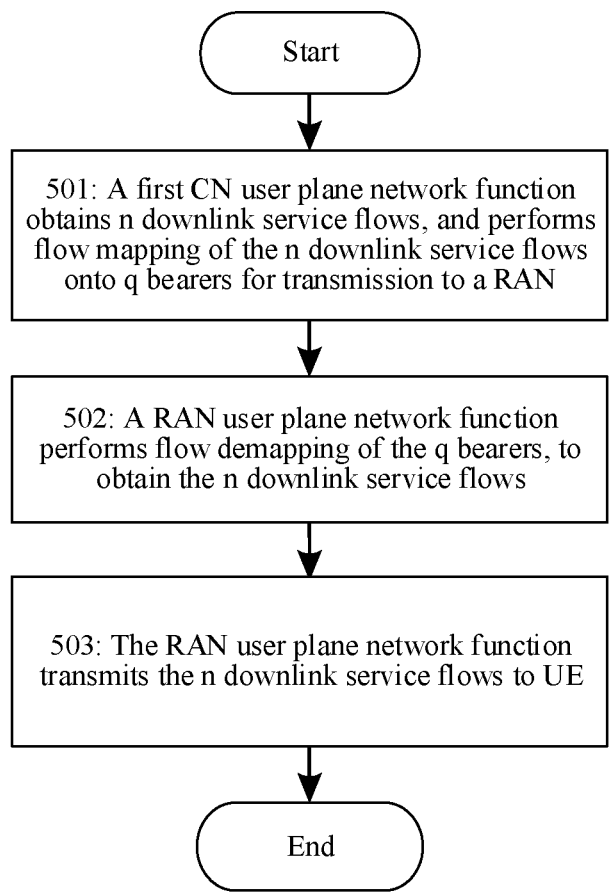
FIG. 5 is a schematic flowchart of a method for managing QoS of downlink transmission in a wireless communications system according to an embodiment of the present disclosure.

FIG. 5 is a schematic flowchart of another embodiment of a method for managing QoS of downlink transmission in a wireless communications system according to the present disclosure. In this embodiment, a downlink service flow is transmitted from a PDN network to UE. On one hand, when a QoS control function exists only in a CN, a CN user plane network function and a RAN user plane network function implement, according to a QoS rule delivered by the QoS control function, that a service flow is transmitted in a bearer manner in the CN and between the CN and a RAN, and a service flow is transmitted in a service flow manner in the RAN and between the RAN and the UE. On the other hand, when QoS control functions exist in the CN and the RAN, the CN user plane network function implements, according to the QoS rule delivered by the CN QoS control function, that a service flow is transmitted in a bearer manner in the CN and between the CN and the RAN, and the RAN user plane network function implements, according to a QoS rule delivered by the RAN QoS control function, that a service flow is transmitted in a service flow manner in the RAN and between the RAN and the UE. In addition, the CN user plane network function performs parameter configuration on a bearer in the CN and a bearer between the CN and the RAN based on a first QoS parameter configuration, and the RAN user plane network function performs parameter configuration on a service flow in the RAN and a service flow between the RAN and the UE based on a second QoS parameter configuration. As shown in FIG. 5, the method includes the following steps.

501: A first CN user plane network function obtains n downlink service flows, and performs flow mapping of the n downlink service flows to q bearers for transmission to a RAN.

502: A RAN user plane network function performs flow demapping of the q bearers, to obtain the n downlink service flows.

Implementations of steps 501 and 502 are respectively similar to implementations of steps 401 and 402 in the foregoing embodiment. Details are not described herein again.

503: The RAN user plane network function transmits the n downlink service flows to UE.

In this embodiment of the present disclosure, the RAN user plane network function transmits, according to the QoS rule sent by the CN QoS control function or the RAN QoS control function, the n downlink service flows obtained through the flow demapping in the RAN and between the RAN and the UE in a service flow manner. The n downlink service flows may be forwarded by one or more RAN user plane network functions in the RAN. In addition, the RAN user plane network function performs parameter configuration on the n downlink service flows based on second QoS parameter configuration information, to ensure QoS of each service flow.

Figure 6:
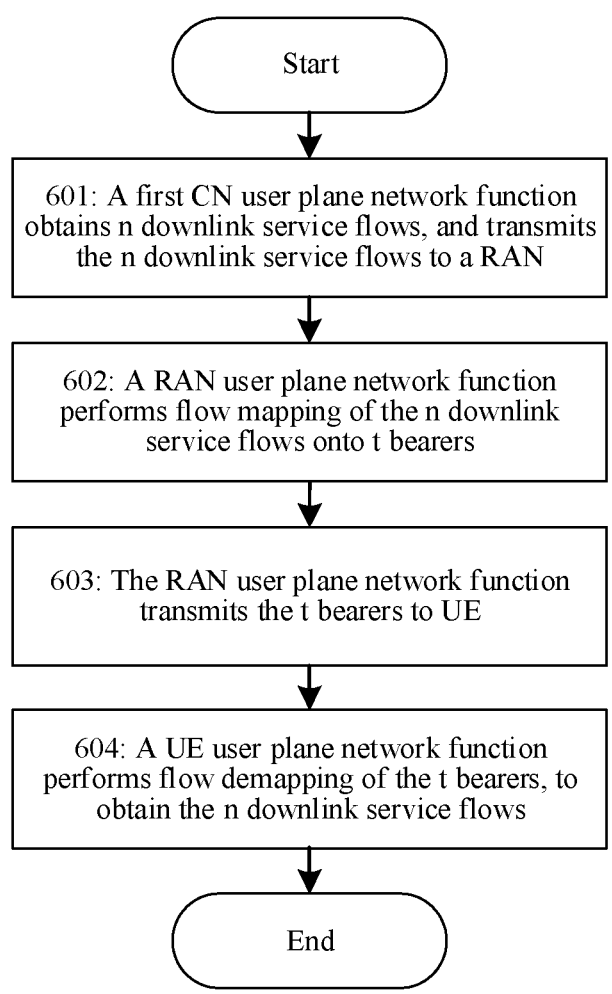
FIG. 6 is a schematic flowchart of a method for managing QoS of downlink transmission in a wireless communications system according to an embodiment of the present disclosure.

FIG. 6 is a schematic flowchart of another embodiment of a method for managing QoS of downlink transmission in a wireless communications system according to the present disclosure. In this embodiment, a downlink service flow is transmitted from a PDN network to UE. On one hand, when a QoS control function exists only in a CN, a CN user plane network function and a RAN user plane network function implement, according to a QoS rule delivered by the QoS control function, that a service flow is transmitted in a service flow manner in the CN and between the CN and a RAN, and a service flow is transmitted in a bearer manner in the RAN and between the RAN and the UE. On the other hand, when QoS control functions exist in the CN and the RAN, the CN user plane network function implements, according to a QoS rule delivered by the CN QoS control function, that a service flow is transmitted in a service flow manner in the CN and between the CN and the RAN, and the RAN user plane network function implements, according to a QoS rule delivered by the RAN QoS control function, that a service flow is transmitted in a bearer manner in the RAN and between the RAN and the UE. In addition, the CN user plane network function performs parameter configuration on a service flow in the CN and a service flow between the CN and the RAN based on a first QoS parameter configuration, and the RAN user plane network function performs parameter configuration on a bearer in the RAN and a bearer between the RAN and the UE based on a second QoS parameter configuration. As shown in FIG. 6, the method includes the following steps.

601: A first CN user plane network function obtains n downlink service flows and transmits the n downlink service flows to a RAN.

n is an integer greater than or equal to 1. The first CN user plane network function is a user plane network function of a connection between an external PDN and a CN, and is, for example, a PDN gateway.

In this embodiment of the present disclosure, the first CN user plane network function transmits, according to the QoS rule sent by the CN QoS control function, the n downlink service flows in the CN and between the CN and the RAN. The n downlink service flows are service data transmitted from the PDN network to a user equipment. In addition, the CN user plane network function performs parameter configuration on a service flow in the CN and a service flow between the CN and the RAN based on a first QoS parameter configuration, to ensure QoS of each service flow.

602: A RAN user plane network function performs flow mapping of the n downlink service flows to t bearers.

603: The RAN user plane network function transmits the t bearers to UE.

604: A UE user plane network function performs flow demapping of the t bearers, to obtain the n downlink service flows.

Implementations of steps 602, 603, and 604 are respectively similar to implementations of steps 403, 404, and 405 in the foregoing embodiment. Details are not described herein again.

Figure 7:
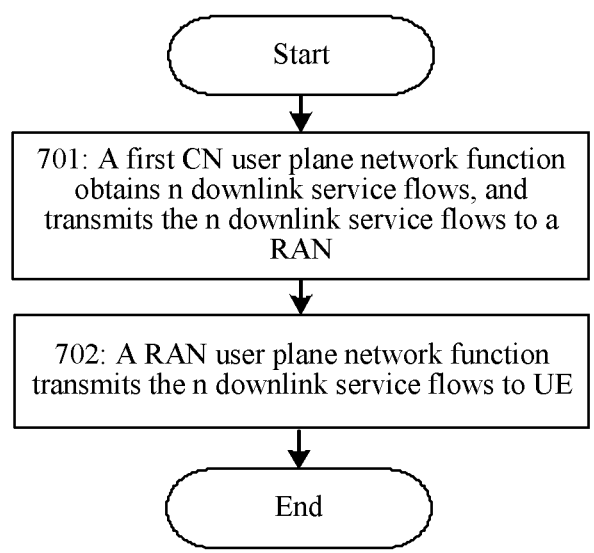
FIG. 7 is a schematic flowchart of a method for managing QoS of downlink transmission in a wireless communications system according to an embodiment of the present disclosure.

FIG. 7 is a schematic flowchart of another embodiment of a method for managing QoS of downlink transmission in a wireless communications system according to the present disclosure. In this embodiment, a downlink service flow is transmitted from a PDN network to a user equipment. On one hand, when a QoS control function exists only in a CN, a CN user plane network function and a RAN user plane network function implement, according to a QoS rule delivered by the QoS control function, that a service flow is transmitted in a service flow manner in the CN, between the CN and a RAN, in the RAN, and between the RAN and the UE. On the other hand, when QoS control functions exist in the CN and the RAN, the CN user plane network function implements, according to a QoS rule delivered by the CN QoS control function, and the RAN user plane network function implements, according to a QoS rule delivered by the RAN QoS control function, respectively, that a service flow is transmitted in a service flow manner in the CN, between the CN and the RAN, in the RAN, and between the RAN and the UE. In addition, the CN user plane network function performs parameter configuration on a service flow in the CN and a service flow between the CN and the RAN based on a first QoS parameter configuration, and the RAN user plane network function performs parameter configuration on a service flow in the RAN and a service flow between the RAN and the UE based on a second QoS parameter configuration. As shown in FIG. 7, the method includes the following steps:

701: A first CN user plane network function obtains n downlink service flows and transmits the n downlink service flows to a RAN.

702: A RAN user plane network function transmits the n downlink service flows to UE.

Implementations of steps 701 and 702 are respectively similar to implementations of steps 601 and 503 in the foregoing embodiments. Details are not described herein again.

Figure 8:
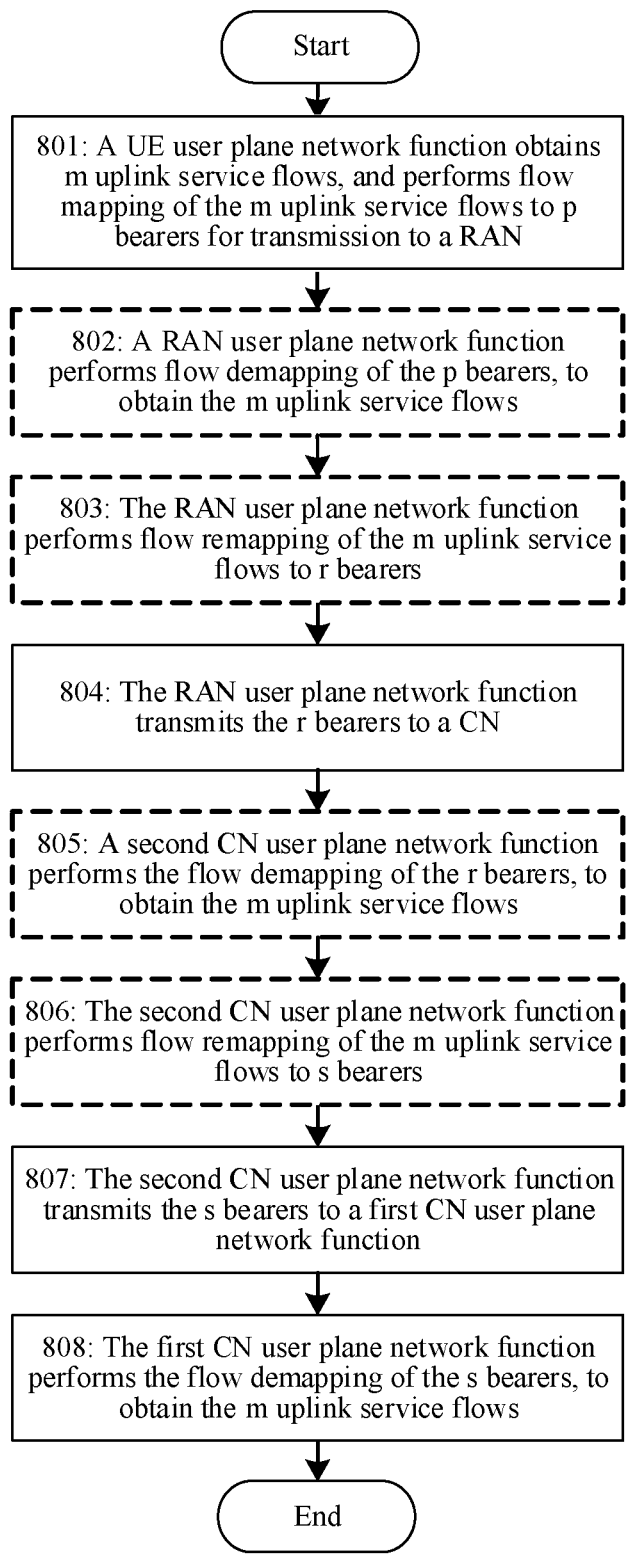
FIG. 8 is a schematic flowchart of a method for managing QoS of downlink transmission in a wireless communications system according to an embodiment of the present disclosure.

FIG. 8 is a schematic flowchart of an embodiment of a method for managing QoS of uplink transmission in a wireless communications system according to the present disclosure. In this embodiment, an uplink service flow is transmitted from UE to a PDN network. On one hand, when a QoS control function exists only in a CN, a UE user plane network function, a RAN user plane network function, and a CN user plane network function implement, according to a QoS rule delivered by the CN QoS control function, that a service flow is transmitted in a bearer manner between the UE and a RAN, in the RAN, between the RAN and the CN, and in the CN. On the other hand, when QoS control functions exist in the CN and the RAN, the UE user plane network function implements, according to the QoS rule delivered by the CN QoS control function or the RAN QoS control function, that a service flow is transmitted in a bearer manner between the UE and the RAN, in the RAN, between the RAN and the CN, and in the CN; the RAN user plane network function implements, according to the QoS rule delivered by the RAN QoS control function, and the CN user plane network function implements, according to the QoS rule delivered by the CN QoS control function, respectively, that a service flow is transmitted in a bearer manner between the UE and the RAN, in the RAN, between the RAN and the CN, and in the CN. In addition, the UE user plane network function performs parameter configuration on a bearer between the UE and the RAN based on an uplink QoS parameter configuration; the RAN user plane network function performs parameter configuration on a bearer in the RAN and a bearer between the RAN and the CN based on a second QoS parameter configuration; and the CN user plane network function performs parameter configuration on a bearer in the CN based on a first QoS parameter configuration. As shown in FIG. 8, the method includes the following steps.

801: A UE user plane network function obtains m uplink service flows, and performs flow mapping of the m uplink service flows to p bearers for transmission to a RAN.

m and p are both integers greater than or equal to 1.

In this embodiment of the present disclosure, the UE user plane network function may obtain the m uplink service flows from an application server, and then maps, according to the QoS rule sent by the CN QoS control function or the RAN QoS control function, the m uplink service flows to the p bearers for transmission between the UE and the RAN. The m uplink service flows are service data transmitted from the UE to the PDN network. According to the QoS rule, the UE user plane network function may map the m uplink service flows to the p bearers evenly, or map m uplink service data flows to the p bearers unevenly. For example, if m is equal to p, a one-to-one mapping of a service flow to a bearer is implemented; if m is greater than p, a many-to-one mapping of a service flow to a bearer is implemented; and if m is less than p, a one-to-many mapping of a service flow to a bearer is implemented. In addition, the UE user plane network function performs parameter configuration on the p bearers based on uplink QoS parameter configuration information, to ensure QoS of each bearer.

802: A RAN user plane network function performs flow demapping of the p bearers, to obtain the m uplink service flows.

The flow demapping is a reverse process of the flow mapping in step 801.

803: The RAN user plane network function performs flow remapping of the m uplink service flows to r bearers.

r is an integer greater than or equal to 1.

In this embodiment of the present disclosure, the RAN user plane network function remaps, according to the QoS rule sent by the CN QoS control function or the RAN QoS control function, the m uplink service flows obtained through the flow demapping to the r bearers. According to the QoS rule, the RAN user plane network function may map the m uplink service flows to the r bearers evenly, or map the m uplink service flows to the r bearers unevenly. For example, if m is equal to r, a one-to-one mapping of a service flow to a bearer is implemented; if m is greater than r, a many-to-one mapping of a service flow to a bearer is implemented; and if m is less than r, a one-to-many mapping of a service flow to a bearer is implemented.

804: The RAN user plane network function transmits the r bearers to a CN.

In this embodiment of the present disclosure, the RAN user plane network function transmits the r bearers in the RAN and between the RAN and the CN. The r bearers may be forwarded by one or more RAN user plane network functions in the RAN. In addition, the RAN user plane network function performs parameter configuration on the r bearers based on second QoS parameter configuration information, to ensure QoS of each bearer.

805: A second CN user plane network function performs the flow demapping of the r bearers, to obtain the m uplink service flows.

The second CN user plane network function is a user plane network function of a connection between the RAN and a CN, and is, for example, a serving gateway. The flow demapping is a reverse process of the flow mapping of step 804.

806: The second CN user plane network function performs flow remapping of the m uplink service flows to s bearers.

s is an integer greater than or equal to 1.

In this embodiment of the present disclosure, the second CN user plane network function remaps, according to the QoS rule sent by the CN QoS control function, the m uplink service flows obtained through the flow demapping to the s bearers. According to the QoS rule, the second CN user plane network function may map the m uplink service flows to the s bearers evenly, or map the m uplink service flows to the s bearers unevenly. For example, if m is equal to s, a one-to-one mapping of a service flow to a bearer is implemented; if m is greater than s, a many-to-one mapping of a service flow to a bearer is implemented; and if m is less than s, a one-to-many mapping of a service flow to a bearer is implemented.

807: The second CN user plane network function transmits the s bearers to a first CN user plane network function.

The first CN user plane network function is a user plane network function of a connection between an external PDN and the CN, and is, for example, a PDN gateway.

In this embodiment of the present disclosure, the second CN user plane network function transmits the s bearers in the CN to the first CN user plane network function. The s bearers may be forwarded by one or more CN user plane network functions in the CN. In addition, the second CN user plane network function performs parameter configuration on the s bearers based on first QoS parameter configuration information, to ensure QoS of each bearer.

808: The first CN user plane network function performs the flow demapping of the s bearers, to obtain the m uplink service flows.

In this embodiment of the present disclosure, the first CN user plane network function performs, according to the QoS rule sent by the CN QoS control function, the flow demapping of the received s bearers to obtain the m uplink service flows.

In the embodiment in FIG. 8, the RAN and the CN may implement different bearer mapping manners, namely, a mapping between a service flow and a bearer, based on respective network resource usage. On one hand, when the QoS control function exists only in the CN, the RAN may report resource usage of the RAN to the CN, and the CN QoS control function determines respective bearer mapping manners of the UE, the RAN, and the CN. On the other hand, when the QoS control functions exist in the CN and the RAN, the CN and the RAN may determine respective bearer mapping manners respectively based on network resource usage of the CN and the RAN, and a bearer mapping manner of the UE also depends on the network resource usage of the RAN. In this embodiment, bearers to which the m uplink service flows are mapped in the UE, bearers to which the m uplink service flows are mapped in the RAN, and bears to which the m uplink service flows are mapped in the CN may be independent of each other. Namely, a manner of mapping the m uplink service flows to the p bearers, a manner of mapping the m uplink service flows to the r bearers, and a manner of mapping the m uplink service flows to the s bearers may be different from each other. For example, p is equal to r, r is equal to s, and bearer mapping manners are the same; p is equal to r, r is equal to s, but the bearer mapping manners are different; p is equal to r, but r is no equal to s; or p is not equal to r, and r is not to equal to s. If bearer mapping manners of service flows in the UE and the RAN are the same, steps 802 and 803 may be omitted. Similarly, if bearer mapping manners of service flows in the RAN and the CN are the same, steps 805 and 806 may be omitted.

In the embodiment in FIG. 8, a service flow is transmitted in a bearer manner between the UE and the RAN, in the RAN, between the RAN and the CN, and in the CN. In another implementation, the UE may implement, according to the QoS rule delivered by the CN QoS control function or the RAN QoS control function, that a service flow is transmitted in a service flow manner between the UE and the RAN, and a service flow is still transmitted in a bearer manner in the RAN, between the RAN and the CN, and in the CN. In this case, steps 801 and 802 are changed as: The UE user plane network function obtains the m uplink service flows and transmits the m uplink service flows to the RAN. In addition, the UE user plane network function performs parameter configuration on the m uplink service flows based on uplink QoS parameter configuration information, to ensure QoS of each service flow. Steps 803 to 808 remain unchanged.

Figure 9:
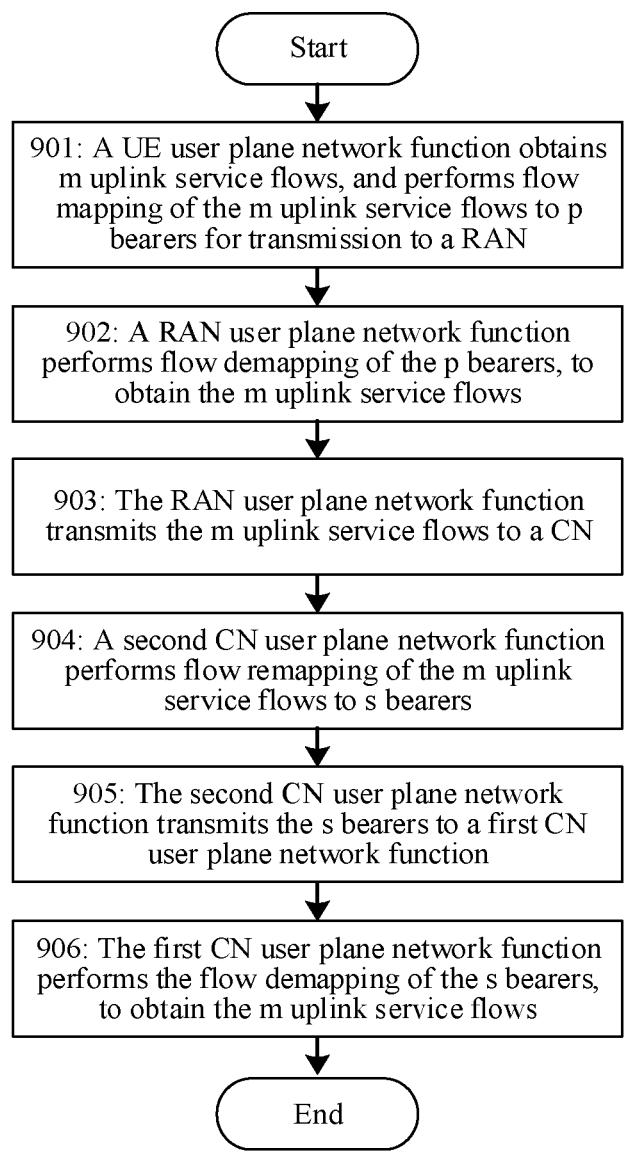
FIG. 9 is a schematic flowchart of a method for managing QoS of uplink transmission in a wireless communications system according to an embodiment of the present disclosure.

FIG. 9 is a schematic flowchart of another embodiment of a method for managing QoS of uplink transmission in a wireless communications system according to the present disclosure. In this embodiment, an uplink service flow is transmitted from UE to a PDN network. On one hand, when a QoS control function exists only in a CN, a UE user plane network function, a RAN user plane network function, and a CN user plane network function implement, according to a QoS rule delivered by the CN QoS control function, that a service flow is transmitted in a bearer manner between the UE and a RAN and in the CN, and a service flow is transmitted in a service flow manner in the RAN and between the RAN and the CN. On the other hand, when QoS control functions exist in the CN and the RAN, the UE user plane network function implements, according to the QoS rule delivered by the CN QoS control function or the RAN QoS control function, the RAN user plane network function implements, according to a QoS rule delivered by the RAN QoS control function, and the CN user plane network function implements, according to the QoS rule delivered by the CN QoS control function, respectively, that a service flow is transmitted in a bearer manner between the UE and the RAN and in the CN, and a service flow is transmitted in a service flow manner in the RAN and between the RAN and the CN. In addition, the UE user plane network function performs parameter configuration on a bearer between the UE and the RAN based on an uplink QoS parameter configuration; the RAN user plane network function performs parameter configuration on a service flow in the RAN and a service flow between the RAN and the CN based on a second QoS parameter configuration; and the CN user plane network function performs parameter configuration on a bearer in the CN based on a first QoS parameter configuration. As shown in FIG. 9, the method includes the following steps.

901: A UE user plane network function obtains m uplink service flows, and performs flow mapping of the m uplink service flows to p bearers for transmission to a RAN.

902: A RAN user plane network function performs flow demapping of the p bearers, to obtain the m uplink service flows.

Implementations of steps 901 and 902 are respectively similar to implementations of steps 801 and 802 in the foregoing embodiment. Details are not described herein again.

903: The RAN user plane network function transmits the m uplink service flows to a CN.

In this embodiment of the present disclosure, the RAN user plane network function transmits, according to the QoS rule sent by the CN QoS control function or the RAN QoS control function, the m uplink service flows obtained through the flow demapping in the RAN and between the RAN and the CN. In addition, the RAN user plane network function performs parameter configuration on the m uplink service flows based on second QoS parameter configuration information, to ensure QoS of each service flow.

904: A second CN user plane network function performs flow remapping of the m uplink service flows to s bearers.

905: The second CN user plane network function transmits the s bearers to a first CN user plane network function.

906: The first CN user plane network function performs the flow demapping of the s bearers, to obtain the m uplink service flows.

Implementations of steps 904, 905, and 906 are respectively similar to implementations of steps 806, 807, and 808 in the foregoing embodiment. Details are not described herein again.

In the embodiment in FIG. 9, a service flow is transmitted in a bearer manner between the UE and the RAN and in the CN, and a service flow is transmitted in a service flow manner in the RAN and between the RAN and the CN. In another implementation, the UE may implement, according to the QoS rule delivered by the CN QoS control function or the RAN QoS control function, that a service flow is transmitted in a service flow manner between the UE and the RAN, in the RAN, and between the RAN and the CN, and a service flow is still transmitted in a bearer manner in the CN. In this case, steps 901 and 902 are changed as: The UE user plane network function obtains the m uplink service flows and transmits the m uplink service flows to the RAN. In addition, the UE user plane network function performs parameter configuration on the m uplink service flows based on uplink QoS parameter configuration information, to ensure QoS of each service flow. Steps 903 to 906 remain unchanged.

Figure 10:
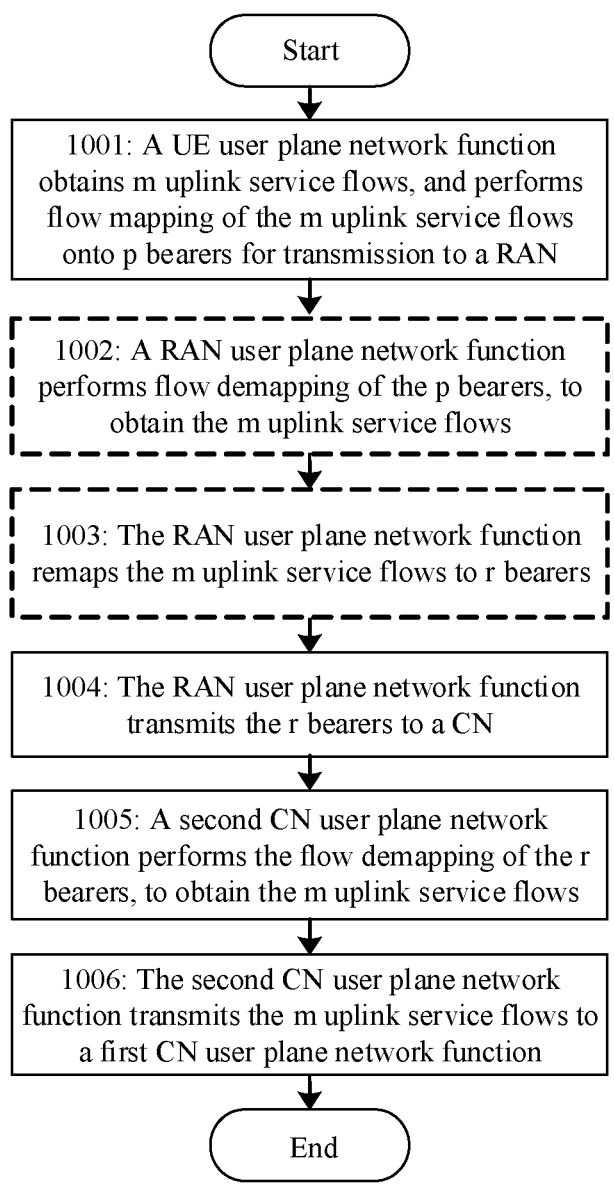
FIG. 10 is a schematic flowchart of a method for managing QoS of uplink transmission in a wireless communications system according to an embodiment of the present disclosure.

FIG. 10 is a schematic flowchart of another embodiment of a method for managing QoS of uplink transmission in a wireless communications system according to the present disclosure. In this embodiment, an uplink service flow is transmitted from UE to a PDN network. On one hand, when a QoS control function exists only in a CN, a UE user plane network function, a RAN user plane network function, and a CN user plane network function implement, according to a QoS rule delivered by the CN QoS control function, that a service flow is transmitted in a bearer manner between the UE and a RAN, in the RAN, and between the RAN and the CN, and a service flow is transmitted in a service flow manner in the CN. On the other hand, when QoS control functions exist in the CN and the RAN, the UE user plane network function implements, according to the QoS rule delivered by the CN QoS control function or the RAN QoS control function, the RAN user plane network function implements, according to the QoS rule delivered by the RAN QoS control function, and the CN user plane network function implements, according to the QoS rule delivered by the CN QoS control function, respectively, that a service flow is transmitted in a bearer manner between the UE and the RAN, in the RAN, and between the RAN and the CN, and a service flow is transmitted in a service flow manner in the CN. In addition, the UE user plane network function performs parameter configuration on a bearer between the UE and the RAN based on an uplink QoS parameter configuration; the RAN user plane network function performs parameter configuration on a bearer in the RAN and a bearer between the RAN and the CN based on a second QoS parameter configuration; and the CN user plane network function performs parameter configuration on a service flow in the CN based on a first QoS parameter configuration. As shown in FIG. 10, the method includes the following steps.

1001: A UE user plane network function obtains m uplink service flows, and performs flow mapping of the m uplink service flows to p bearers for transmission to a RAN.

1002: A RAN user plane network function performs flow demapping of the p bearers, to obtain the m uplink service flows.

1003: The RAN user plane network function remaps the m uplink service flows to r bearers.

1004: The RAN user plane network function transmits the r bearers to a CN.

1005: A second CN user plane network function performs the flow demapping of the r bearers, to obtain the m uplink service flows.

Implementations of steps 1001, 1002, 1003, 1004, and 1005 are respectively similar to implementations of steps 801, 802, 803, 804, and 805 in the foregoing embodiment. Details are not described herein again.

1006: The second CN user plane network function transmits the m uplink service flows to a first CN user plane network function.

In this embodiment of the present disclosure, the second CN user plane network function transmits the m uplink service flows in the CN to the first CN user plane network function. The m uplink service flows may be forwarded by one or more CN user plane network functions in the CN. The second CN user plane network function performs parameter configuration on the m uplink service flows based on first QoS parameter configuration information, to ensure QoS of each service flow.

In the embodiment in FIG. 10, a service flow is transmitted in a bearer manner between the UE and the RAN, in the RAN, and between the RAN and the CN, and a service flow is transmitted in a service flow manner in the CN. In another implementation, the UE may implement, according to the QoS rule delivered by the CN QoS control function or the RAN QoS control function, that a service flow is transmitted in a service flow manner between the UE and the RAN and in the CN, and a service flow is still transmitted in a bearer manner in the RAN and between the RAN and the CN. In this case, steps 1001 and 1002 are changed as: The UE user plane network function obtains the m uplink service flows and transmits the m uplink service flows to the RAN. In addition, the UE user plane network function performs parameter configuration on the m uplink service flows based on uplink QoS parameter configuration information, to ensure QoS of each service flow. Steps 1003 to 1006 remain unchanged.

Figure 11:
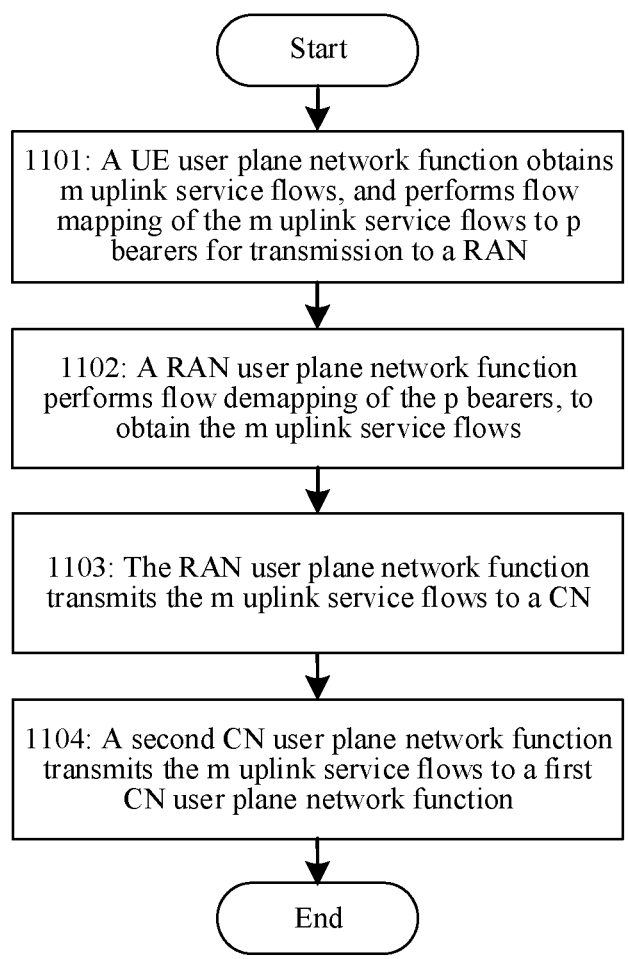
FIG. 11 is a schematic flowchart of a method for managing QoS of uplink transmission in a wireless communications system according to an embodiment of the present disclosure.

FIG. 11 is a schematic flowchart of another embodiment of a method for managing QoS of uplink transmission in a wireless communications system according to the present disclosure. In this embodiment, an uplink service flow is transmitted from UE to a PDN network. On one hand, when a QoS control function exists only in a CN, a UE user plane network function, a RAN user plane network function, and a CN user plane network function implement, according to a QoS rule delivered by the CN QoS control function, that a service flow is transmitted in a bearer manner between the UE and a RAN, and a service flow is transmitted in a service flow manner in the RAN, between the RAN and the CN, and in the CN. On the other hand, when QoS control functions exist in the CN and the RAN, the UE user plane network function implements, according to the QoS rule delivered by the CN QoS control function or the RAN QoS control function, the RAN user plane network function implements, according to a QoS rule delivered by the RAN QoS control function, and the CN user plane network function implements, according to the QoS rule delivered by the CN QoS control function, respectively, that a service flow is transmitted in a bearer manner between the UE and the RAN, and a service flow is transmitted in a service flow manner in the RAN, between the RAN and the CN, and in the CN. In addition, the UE user plane network function performs parameter configuration on a bearer between the UE and the RAN based on an uplink QoS parameter configuration; the RAN user plane network function performs parameter configuration on a service flow in the RAN and a service flow between the RAN and the CN based on a second QoS parameter configuration; and the CN user plane network function performs parameter configuration on a service flow in the CN based on a first QoS parameter configuration. As shown in FIG. 11, the method includes the following steps:

1101: A UE user plane network function obtains m uplink service flows, and performs flow mapping of the m uplink service flows to p bearers for transmission to a RAN.

1102: A RAN user plane network function performs flow demapping of the p bearers, to obtain the m uplink service flows.

1103: The RAN user plane network function transmits the m uplink service flows to a CN.

1104: A second CN user plane network function transmits the m uplink service flows to a first CN user plane network function.

Implementations of steps 1101, 1102, 1103, and 1104 are respectively similar to implementations of steps 801, 802, 903, and 1006 in the foregoing embodiments. Details are not described herein again.

In the embodiment in FIG. 11, a service flow is transmitted in a bearer manner between the UE and the RAN, and a service flow is transmitted in a service flow manner in the RAN, between the RAN and the CN, and in the CN. In another implementation, the UE may implement, according to the QoS rule delivered by the CN QoS control function or the RAN QoS control function, that a service flow is transmitted in a service flow manner the UE and the RAN, in the RAN, between the RAN and the CN, and in the CN. In this case, steps 1101 and 1102 are changed as: The UE user plane network function obtains the m uplink service flows and transmits the m uplink service flows to the RAN. In addition, the UE user plane network function performs parameter configuration on the m uplink service flows based on uplink QoS parameter configuration information, to ensure QoS of each service flow. Steps 1103 and 1104 remain unchanged.

Figure 12:
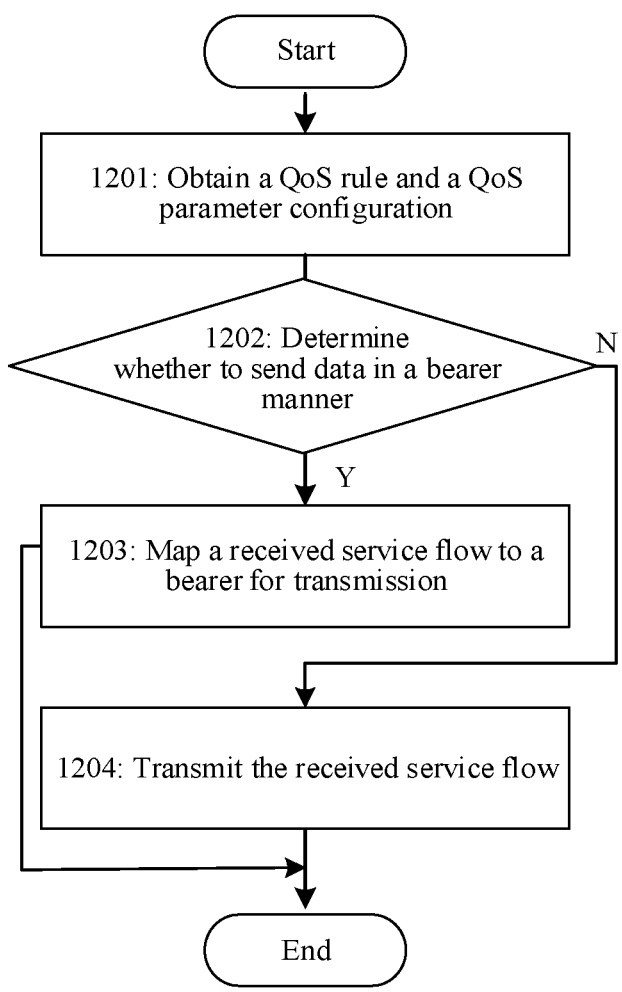
FIG. 12 is a schematic flowchart of a method for transmitting data in a wireless communications system according to an embodiment of the present disclosure.

FIG. 12 is a schematic flowchart of an embodiment of a method for transmitting data in a wireless communications system according to the present disclosure. The method includes the following steps:

1201: Obtain a QoS rule and a QoS parameter configuration.

1202: Determine whether to send data in a bearer manner. If it is determined to send data in a bearer manner, the process proceeds to step 1203; otherwise, it indicates sending of data in a service flow manner, and the process proceeds to step 1204.

1203: Map a received service flow to a bearer for transmission.

1204: Directly transmit the received service flow.

The data transmission method provided in this embodiment of the present disclosure may be performed by a first CN user plane network function. Correspondingly, the data transmission is downlink transmission. The first CN user plane network function is a user plane network function of a connection between an external PDN and a CN, and is, for example, a PDN gateway. In step 1201, the first CN user plane network function obtains a QoS rule sent by a CN QoS control function, and determines a transmission manner in step 1202. In addition, in step 1201, the first CN user plane network function obtains a parameter configuration sent by a first QoS parameter configuration function, and the parameter configuration is used in step 1203 or step 1204 for ensuring QoS of transmission.

The data transmission method provided in this embodiment of the present disclosure may be performed by a UE user plane network function. Correspondingly, the data transmission is uplink transmission. In step 1201, on one hand, when the QoS control function exists only in the CN, the UE user plane network function obtains the QoS rule delivered by the CN QoS control function, and determines a transmission manner in step 1202. On the other hand, when QoS control functions exist in the CN and a RAN, the UE user plane network function obtains the QoS rule delivered by the CN QoS control function or the RAN QoS control function, and determines a transmission manner in step 1202. In addition, in step 1201, the UE user plane network function obtains a parameter configuration sent by an uplink QoS parameter configuration function, and the parameter configuration is used in step 1203 or step 1204 for ensuring QoS of transmission.

Figure 13:
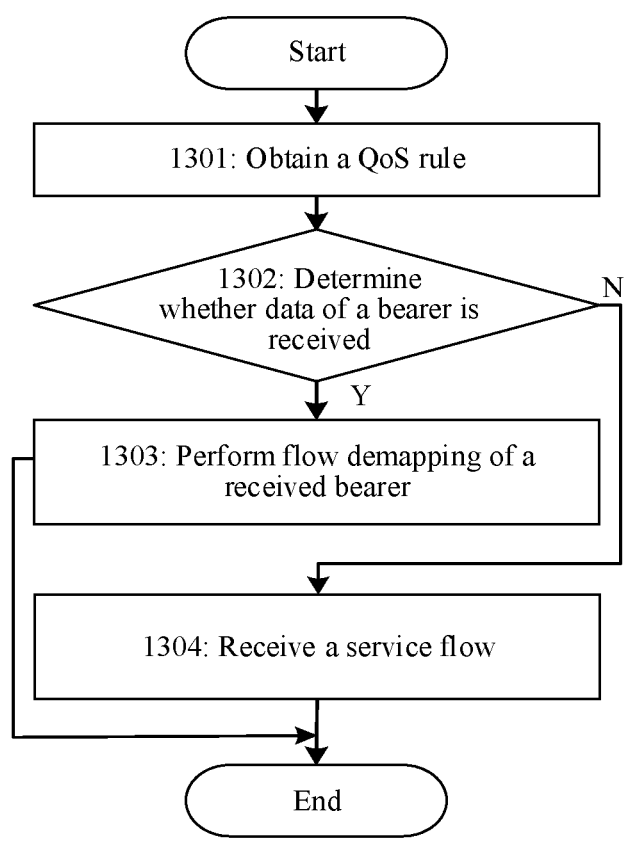
FIG. 13 is a schematic flowchart of a method for transmitting data in a wireless communications system according to an embodiment of the present disclosure.

FIG. 13 is a schematic flowchart of another embodiment of a method for transmitting data in a wireless communications system according to the present disclosure. The method includes the following steps.

1301: Obtain a QoS rule.

1302: Determine whether data of a bearer is received. If it is determined that data of a bearer is received, the process proceeds to step 1303; otherwise, it indicates receiving of data in a service flow manner, and the process proceeds to step 1304.

In this embodiment of the present disclosure, by detecting a data packet format of received data, it can be determined whether the received data is data of a bearer or data of a service flow. For example, a data packet header of a bearer includes a tunnel endpoint identifier of the GTP, and there is no tunnel endpoint identifier in a data packet header of a service flow. Therefore, whether the received data is data of a bearer or data of a service flow may be determined by detecting whether a data packet header includes a tunnel endpoint identifier.

1303: Perform flow demapping of a received bearer.

1304: Receive a service flow.

The data transmission method provided in this embodiment of the present disclosure may be performed by a first CN user plane network function. Correspondingly, the data transmission is uplink transmission. In step 1301, the first CN user plane network function obtains a QoS rule sent by a CN QoS control function, and determines a receiving manner in step 1302, and determines how to perform the flow demapping of a bearer in step 1303.

The data transmission method provided in this embodiment of the present disclosure may be performed by a UE user plane network function. Correspondingly, the data transmission is uplink transmission. In step 1301, on one hand, when the QoS control function exists only in the CN, the UE user plane network function obtains the QoS rule delivered by the CN QoS control function, and determines a receiving manner in step 1302, and determines, in step 1303, how to perform the flow demapping of a bearer. On the other hand, when QoS control functions exist in the CN and a RAN, the UE user plane network function obtains the QoS rule delivered by the CN QoS control function or the RAN QoS control function, and determines a receiving manner in step 1302, and determines, in step 1303, how to perform the flow demapping of a bearer.

Figure 14:
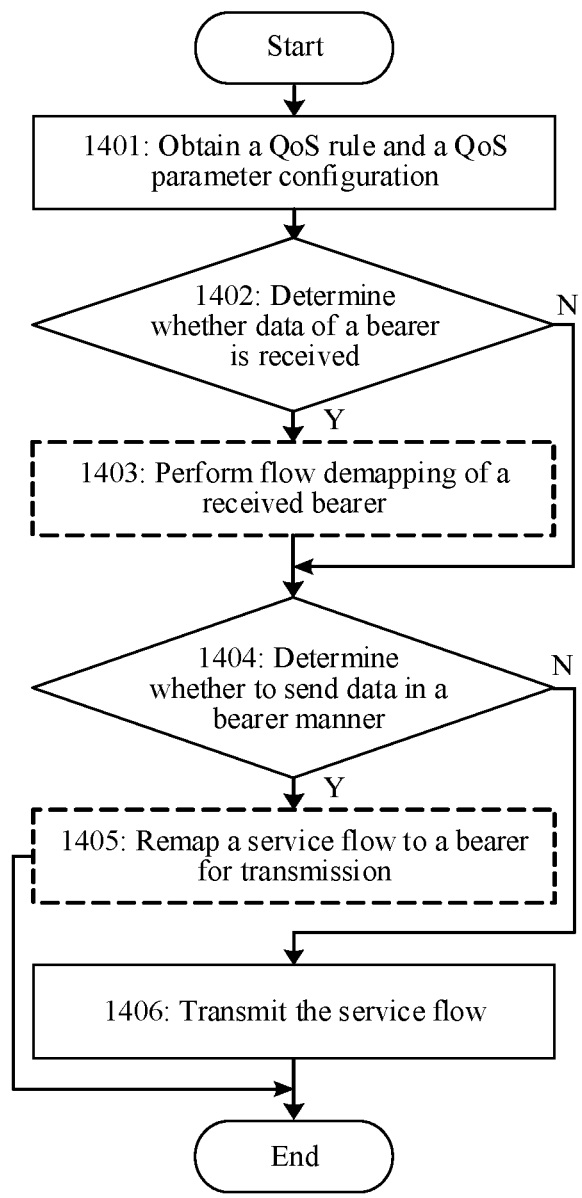
FIG. 14 is a schematic flowchart of a method for transmitting data in a wireless communications system according to an embodiment of the present disclosure.

FIG. 14 is a schematic flowchart of another embodiment of a method for transmitting data in a wireless communications system according to the present disclosure. The method includes the following steps.

1401: Obtain a QoS rule and a QoS parameter configuration.

1402: Determine whether data of a bearer is received. If it is determined that data of a bearer is received, the process proceeds to step 1403; otherwise, it indicates receiving of data in a service flow manner, and the process proceeds to step 1404.

In this embodiment of the present disclosure, by detecting a data packet format of received data, it can be determined whether the received data is data of a bearer or data of a service flow. For example, a data packet header of a bearer includes a tunnel endpoint identifier of the GTP, and there is no tunnel endpoint identifier in a data packet header of a service flow. Therefore, whether the received data is data of a bearer or data of a service flow may be determined by detecting whether a data packet header includes a tunnel endpoint identifier.

1403: Perform flow demapping of a received bearer. The process then proceeds to step 1404.

1404: Determine whether to send data in a bearer manner. If it is determined to send data in a bearer manner, the process proceeds to step 1405; otherwise, it indicates sending of data in a service flow manner, and the process proceeds to step 1406.

1405: Remap a service flow to a bearer for transmission.

In this embodiment of the present disclosure, on one hand, if it is determined in step 1402 to receive data in a bearer manner and it is determined in step 1404 to send data in a bearer manner, in step 1405, a service flow obtained through the flow demapping in step 1403 is remapped to a bearer for transmission. On the other hand, if it is determined in step 1402 to receive data in a service flow manner and it is determined in step 1404 to send data in a bearer manner, in step 1405, a received service flow is remapped to a bearer for transmission.

1406: Directly transmit the service flow.

In this embodiment of the present disclosure, on one hand, if it is determined in step 1402 to receive data in a bearer manner, and it is determined in step 1404 to send data in a service flow manner, in step 1406, a service flow obtained through the flow demapping in step 1403 is transmitted. On the other hand, if it is determined in step 1402 to receive data in a service flow manner, and it is determined in step 1404 to send data in a service flow manner, in step 1405, a received service flow is transmitted.

The data transmission method provided in this embodiment of the present disclosure may be performed by a RAN user plane network function. Correspondingly, the data transmission may be uplink transmission or downlink transmission. In step 1401, on one hand, when a QoS control function exists only in the CN, the RAN user plane network function obtains a QoS rule delivered by the CN QoS control function, and determines a receiving manner in step 1402, and determines a sending manner in step 1404. On the other hand, when QoS control functions exist in the CN and a RAN, the RAN user plane network function obtains a QoS rule delivered by the RAN QoS control function, and determines a receiving manner in step 1402. In addition, in step 1401, the RAN user plane network function obtains a parameter configuration sent by a second QoS parameter configuration function, and the parameter configuration is used in step 1405 or step 1406 for ensuring QoS of transmission. Further, if it is determined in step 1402 to receive data in a bearer manner and it is determined in step 1404 to send data in a bearer manner, and the QoS rule indicates that bearer mapping manners of reception and sending are the same, steps 1403 and 1405 may be omitted.

The data transmission method provided in this embodiment of the present disclosure may be performed by a second CN user plane network function. Correspondingly, the data transmission is uplink transmission. The second CN user plane network function is a user plane network function of a connection between the RAN and the CN, and is, for example, a serving gateway. In step 1401, the second CN user plane network function obtains the QoS rule sent by the CN QoS control function, determines a receiving manner in step 1402, and determines a sending manner in step 1404. In addition, in step 1401, the second CN user plane network function obtains a parameter configuration sent by a first QoS parameter configuration function, and the parameter configuration is used in step 1405 or step 1406 for ensuring QoS of transmission. Further, if it is determined in step 1402 to receive data in a bearer manner and it is determined in step 1404 to send data in a bearer manner, and the QoS rule indicates that bearer mapping manners of reception and sending are the same, steps 1403 and 1405 may be omitted.

The foregoing describes the solutions provided in the embodiments of the present disclosure mainly from perspectives of interaction between network elements and processing of the network elements. It can be understood that to implement the foregoing functions, each network element includes a corresponding hardware structure and/or software module for performing each function. A person skilled in the art should easily realize that with reference to the embodiments disclosed in this specification, this patent application can be implemented in a form of hardware or a form of a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this patent application.

This patent application further provides apparatus embodiments for implementing steps and methods in the foregoing method embodiments. It should be noted that the apparatus embodiments may be used together with the foregoing methods, or may be used alone.

Figure 15:
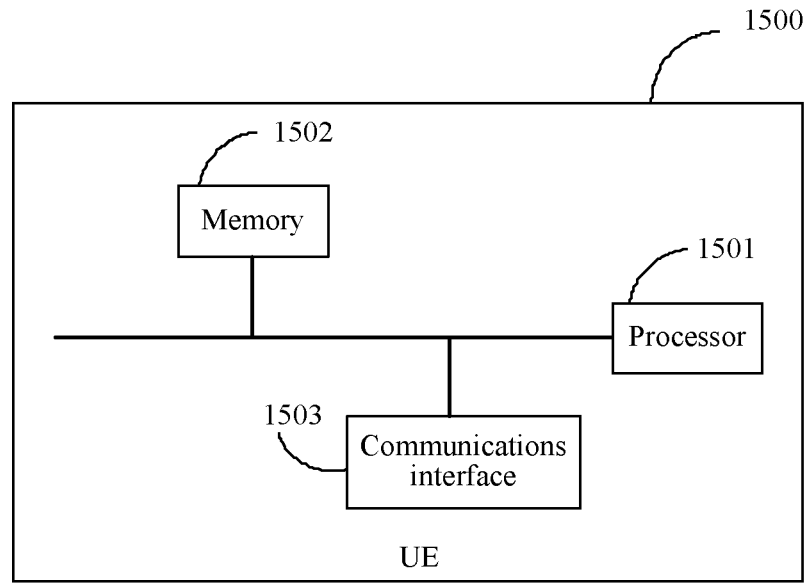
FIG. 15 is a schematic structural diagram of UE according to an embodiment of the present disclosure.

FIG. 15 is a schematic structural diagram of UE 1500 according to an embodiment of the present disclosure. As shown in FIG. 15, the UE 1500 includes a processor 1501, a memory 1502, and a communications interface 1503. The processor 1501 is connected to the memory 1502 and the communications interface 1503. For example, the processor 1501 may be connected to the memory 1502 and the communications interface 1503 by using a bus.

The processor 1501 is configured to support the UE in performing corresponding functions in the foregoing methods. The processor 1501 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1502 is configured to store user plane data that needs to be sent by the UE and control plane data, user plane data, and the like that are received by the UE from a RAN device. Further, the memory 1502 may store a QoS rule, an uplink QoS parameter configuration, and the like that are received from a CN QoS control function or a RAN QoS control function. The memory 1502 may include a volatile memory, for example, a random-access memory (RAM). The memory 1502 may alternatively include a non-volatile memory, for example, a read-only memory (ROM), a flash memory, a hard disk drive (HDD), or a solid-state drive (SSD). The memory 1502 may alternatively include a combination of memories of the foregoing types.

The communications interface 1503 includes a transceiver that communicates with the RAN device, and is configured to receive messages and data involved in the foregoing methods from and send messages and data involved in the foregoing methods to the RAN device.

The processor 1501 may perform the following operation: sending uplink data and/or receiving downlink data through the communications interface 1503. Further, the processor 1501 determines, according to the QoS rule and the uplink QoS parameter configuration that are received from a CN QoS control function or a RAN QoS control function through the communications interface 1503, a manner of receiving and sending data, and processes received data and/or to-be-sent data. Refer to the descriptions of the embodiments in FIG. 12 and FIG. 13 for a specific implementation.

Figure 16:
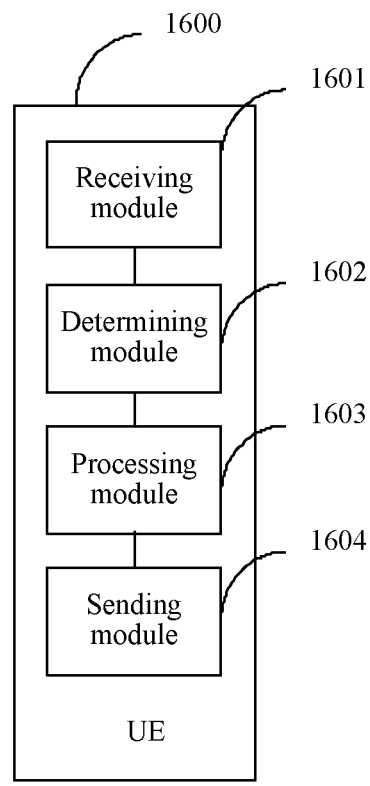
FIG. 16 is a schematic structural diagram of UE according to an embodiment of the present disclosure.

FIG. 16 is a schematic structural diagram of another UE 1600 according to an embodiment of the present disclosure. As shown in FIG. 16, the UE 1600 includes a receiving module 1601, a determining module 1602, a processing module 1603, and a sending module 1604.

The receiving module 1601 has both a control plane function and a user plane function. In a control plane, the receiving module 1601 is configured to receive control plane signaling. Referring to a control plane implementation shown in FIG. 2 and FIG. 3, on one hand, when a QoS control function exists only in a CN, the receiving module 1601 receives a QoS rule and an uplink QoS parameter configuration that are delivered by the CN QoS control function. On the other hand, when QoS control functions exist in the CN and a RAN, the receiving module 1601 receives a QoS rule and an uplink QoS parameter configuration that are delivered by the CN QoS control function or the RAN QoS control function. In a user plane, the receiving module 1601 is configured to receive user plane data. Referring to the user plane implementation shown in FIG. 2 and FIG. 3, the receiving module 1601 receives downlink data transmitted from a RAN device, where the downlink data may be transmitted in a service flow manner or in a bearer manner.

The determining module 1602 determines, by using the obtained QoS rule, a transmission manner of the user plane data. For downlink transmission, the determining module 1602 is configured to determine whether the UE receives the downlink data in a bearer manner or in a service flow manner. For uplink transmission, the determining module 1602 is configured to determine whether the UE sends uplink data in a bearer manner or in a service flow manner.

The processing module 1603 implements processing of user plane data based on a decision of the determining module 1602. Specifically, referring to the descriptions of the embodiments in FIG. 12 and FIG. 13, for the downlink transmission, if the determining module 1602 determines that the UE receives the downlink data in a bearer manner, the processing module 1603 performs, according to the obtained QoS rule, flow demapping processing on a bearer received from the RAN device. For the uplink transmission, if the determining module 1602 determines that the UE sends the uplink data in a bearer manner, the processing module 1603 performs the processing of mapping flows to a bearer on uplink service flows according to the obtained QoS rule and the uplink QoS parameter configuration.

The sending module 1604 sends user plane uplink data based on the decision of the determining module 1602 and/or the processing of the processing module 1603. Referring to the descriptions of the embodiments in FIG. 12 and FIG. 13, if the determining module 1602 determines that the UE sends the uplink data in a bearer manner, the sending module 1604 sends a bearer of which the processing module 1603 performs flow mapping; and if the determining module 1602 determines that the UE sends the uplink data in a service flow manner, the sending module 1604 sends the uplink service flows.

Figure 17:
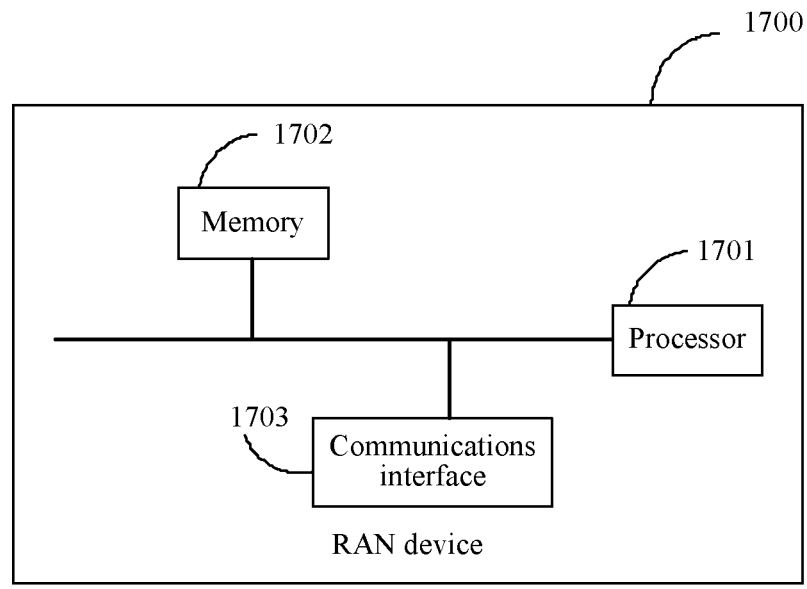
FIG. 17 is a schematic structural diagram of a RAN device according to an embodiment of the present disclosure.

FIG. 17 is a schematic structural diagram of a RAN device 1700 according to an embodiment of the present disclosure. As shown in FIG. 17, the RAN device 1700 includes a processor 1701, a memory 1702, and a communications interface 1703. The processor 1701 is connected to the memory 1702 and the communications interface 1703. For example, the processor 1701 may be connected to the memory 1702 and the communications interface 1703 by using a bus.

The processor 1701 is configured to support the RAN device in performing corresponding functions in the foregoing methods. The processor 1701 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1702 is configured to store control plane data and user plane data that need to be sent by the RAN device and control plane data, user plane data, and the like that are received by the RAN device from a CN device and/or UE. Further, the memory 1702 may store a QoS rule, a second QoS parameter configuration, and the like that are received from a CN QoS control function or a RAN QoS control function. The memory 1702 may include a volatile memory, for example, a random-access memory (RAM). The memory 1702 may alternatively include a non-volatile memory, for example, a read-only memory (ROM), a flash memory, a hard disk drive (HDD), or a solid-state drive (SSD). The memory 1702 may alternatively include a combination of memories of the foregoing types.

The communications interface 1703 includes a transceiver that communicates with the CN device and a transceiver that communicates with the UE, and is configured to receive messages and data involved in the foregoing methods from and send messages and data involved in the foregoing methods to the CN device and the UE.

The processor 1701 may perform the following operation: sending uplink data and/or receiving downlink data through the communications interface 1703. Further, the processor 1701 determines, according to the QoS rule and the QoS parameter configuration that are received from a CN QoS control function or a RAN QoS control function through the communications interface 1703, a manner of receiving and sending data, and processes received data and/or to-be-sent data. Refer to the descriptions of the embodiment in FIG. 14 for a specific implementation.

Figure 18:
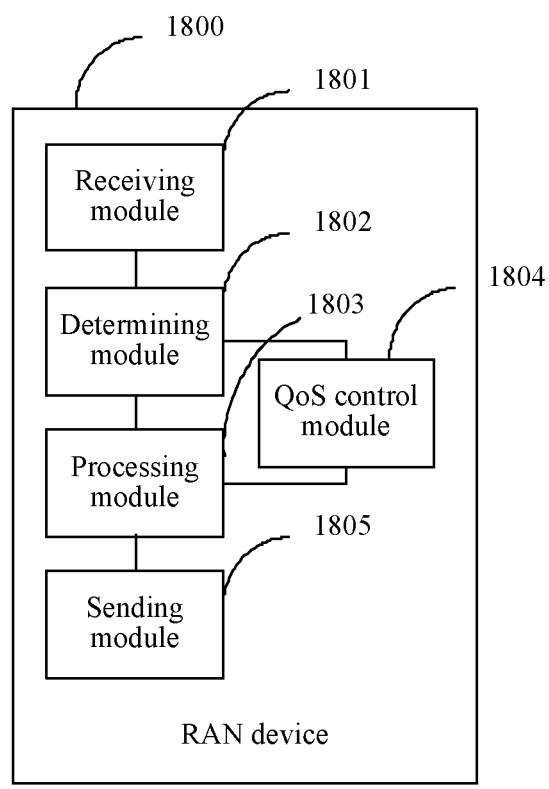
FIG. 18 is a schematic structural diagram of a RAN device according to an embodiment of the present disclosure.

FIG. 18 is a schematic structural diagram of another RAN device 1800 according to an embodiment of the present disclosure. As shown in FIG. 18, the RAN device 1800 includes a receiving module 1801, a determining module 1802, a processing module 1803, a QoS control module 1804, and a sending module 1805.

The receiving module 1801 has both a control plane function and a user plane function. In a control plane, the receiving module 1801 is configured to receive control plane signaling. Referring to a control plane implementation shown in FIG. 2 and FIG. 3, when a QoS control function exists only in a CN, the receiving module 1801 receives a QoS rule and a second QoS parameter configuration that are delivered by the CN QoS control function. In a user plane, the receiving module 1801 is configured to receive user plane data. Referring to the user plane implementation shown in FIG. 2 and FIG. 3, the receiving module 1801 receives downlink data transmitted from a CN device and/or uplink data transmitted from UE. The downlink data and the uplink data may be transmitted in a service flow manner or in a bearer manner.

The determining module 1802 determines, by using the obtained QoS rule, a transmission manner of the user plane data. On one hand, when the QoS control function exists only in the CN, the determining module 1802 determines, according to the QoS rule obtained by the receiving module 1801, a transmission manner of receiving and/or sending user plane data. On the other hand, when QoS control functions exist in the CN and a RAN, the determining module 1802 determines, according to the QoS rule obtained from the QoS control module 1804, a transmission manner of receiving and/or sending user plane data. The received user plane data includes downlink data received from the CN device and/or uplink data received from the UE, and the sent user plane data includes uplink data sent to the CN device and/or downlink data sent to the UE.

The processing module 1803 implements processing of user plane data based on a decision of the determining module 1802. Specifically, referring to the descriptions of the embodiment in FIG. 14, for data reception, if the determining module 1802 determines that the RAN device receives data in a bearer manner, the processing module 1803 performs, according to the QoS rule obtained from the receiving module 1801 or the QoS control module 1804, flow demapping processing on the received bearer. For data transmission, if the determining module 1802 determines that the RAN device sends data in a bearer manner, the processing module 1803 performs, according to the QoS rule and the second QoS parameter configuration that are obtained from the receiving module 1801 or the QoS control module 1804, processing of mapping flows to a bearer on service flows.

The sending module 1804 sends user plane uplink data based on the decision of the determining module 1802 and/or the processing of the processing module 1803. Referring to the user plane implementation shown in FIG. 2 and FIG. 3, if the determining module 1802 determines that the RAN device sends data in a bearer manner, the sending module 1804 sends a bearer of which the processing module 1803 performs flow remapping; and if the determining module 1803 determines that the RAN device sends the data in a service flow manner, the sending module 1804 sends service flows of which the processing module 1803 performs the flow demapping.

Figure 19:
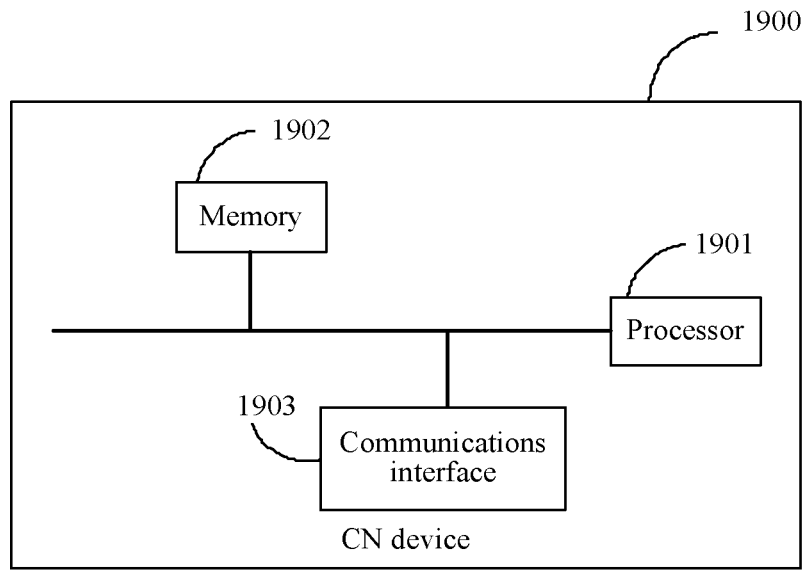
FIG. 19 is a schematic structural diagram of a CN device according to an embodiment of the present disclosure.

FIG. 19 is a schematic structural diagram of a CN device 1900 according to an embodiment of the present disclosure. As shown in FIG. 19, the CN device 1900 includes a processor 1901, a memory 1902, and a communications interface 1903. The processor 1901 is connected to the memory 1902 and the communications interface 1903. For example, the processor 1901 may be connected to the memory 1902 and the communications interface 1903 by using a bus.

The processor 1901 is configured to support the CN device in performing corresponding functions in the foregoing methods. The processor 1901 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1902 is configured to store control plane data and user plane data that need to be sent by the CN device and user plane data and the like that are received by the CN device from a RAN device. Further, the memory 1902 may store a QoS rule, a first QoS parameter configuration, and the like that are received from a CN QoS control function. The memory 1902 may include a volatile memory, for example, a random-access memory (RAM). The memory 1902 may alternatively include a non-volatile memory, for example, a read-only memory (ROM), a flash memory, a hard disk drive (HDD), or a solid-state drive (SSD). The memory 1902 may alternatively include a combination of memories of the foregoing types.

The communications interface 1903 includes a transceiver that communicates with the RAN device, and is configured to receive messages and data involved in the foregoing methods from and send messages and data involved in the foregoing methods to the RAN device.

The processor 1901 may perform the following operation: sending uplink data and/or receiving downlink data through the communications interface 1903. Further, the processor 1901 determines, according to a QoS rule and the first QoS parameter configuration that are received from the QoS control function in the core network, a manner of receiving and sending data, and processes received data and/or to-be-sent data. Refer to the descriptions of the embodiments in FIG. 12 to FIG. 14 for a specific implementation.

Figure 20:
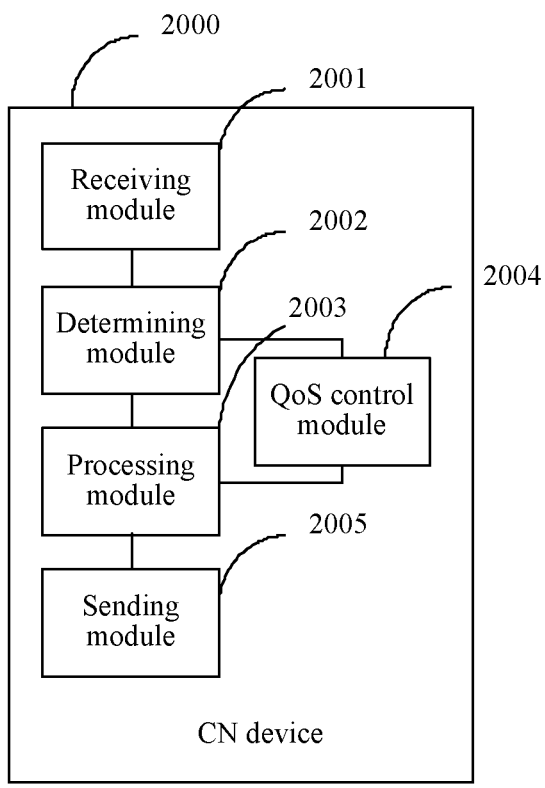
FIG. 20 is a schematic structural diagram of a CN device according to an embodiment of the present disclosure.

FIG. 20 is a schematic structural diagram of another CN device 2000 according to an embodiment of the present disclosure. As shown in FIG. 20, the CN device 2000 includes a receiving module 2001, a determining module 2002, a processing module 2003, a QoS control module 2004, and a sending module 2005.

The receiving module 2001 is configured to receive user plane data. Referring to the user plane implementation shown in FIG. 2 and FIG. 3, the receiving module 2001 receives uplink data transmitted from a RAN device, where the uplink data may be transmitted in a service flow manner or in a bearer manner.

The determining module 2002 is configured to determine, according to a QoS rule obtained from the QoS control module 2004, a transmission manner of receiving and/or sending user plane data. The received user plane data includes uplink data received from the RAN device, and the sent user plane data includes downlink data sent to the RAN device. The transmission manner includes performing data transmission in a service flow manner or in a bearer manner.

The processing module 2003 implements processing of user plane data based on a decision of the determining module 2002. Specifically, referring to the descriptions of the embodiments in FIG. 12 to FIG. 14, for data reception, if the determining module 2002 determines that the CN device receives data in a bearer manner, the processing module 2003 performs, according to the QoS rule obtained from the QoS control module 2004, flow demapping of the received bearer. For data transmission, if the determining module 2002 determines that the CN device sends data in a bearer manner, the processing module 2003 performs, according to the QoS rule and a first QoS parameter configuration that are obtained from the QoS control module 2004, processing of mapping flows to a bearer on service flows.

The sending module 2004 sends user plane uplink data based on the decision of the determining module 2002 and/or the processing of the processing module 2003. Referring to the user plane implementation shown in FIG. 2 and FIG. 3, if the determining module 2002 determines that the RAN device sends data in a bearer manner, the sending module 2004 sends a bearer of which the processing module 2003 performs flow remapping; and if the determining module 2003 determines that the RAN device sends the data in a service flow manner, the sending module 2004 sends service flows of which the processing module 2003 performs the flow demapping.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this patent application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for managing quality of service (QoS) in a wireless communications system, the method comprising:
   receiving, by a radio access network device in a service flow manner, service data transmitted by a core network device from a packet data network (PDN) to a user equipment; and
   mapping, by the radio access network device according to a QoS rule, the service data to t bearers between the radio access network device and the user equipment, and transmitting the service data to the user equipment through the t bearers in a bearer manner, wherein t is an integer greater than or equal to 1.

2. The method according to claim 1, further comprising:
   obtaining, by the radio access network device, the QoS rule from a radio access network QoS controller or the core network device.

3. The method according to claim 1, further comprising:
   mapping, by the radio access network device, the service data to the t bearers evenly for transmission.

4. The method according to claim 1, further comprising:
   mapping, by the radio access network device, the service data to the t bearers unevenly for transmission.

5. The method according to claim 1, further comprising:
   obtaining, by the radio access network device, a second QoS parameter configuration from a second QoS parameter configuration function, and performing QoS parameter configuration on the t bearers based on the second QoS parameter configuration.

6. A method for managing quality of service (QoS) in a wireless communications system, the method comprising:
   receiving, by a radio access network device through p bearers between a user equipment and the radio access network device, service data from the user equipment to a packet data network (PDN) network, wherein p is an integer greater than or equal to 1;
   performing, by the radio access network device, flow demapping of data of the p bearers according to a QoS rule, to obtain the service data from the p bearers; and
   transmitting, by the radio access network device, the service data obtained from the flow demapping to a core network device of the PDN network in a service flow manner.

7. The method according to claim 6, further comprising:
   obtaining, by the radio access network device, the QoS rule from a radio access network QoS controller or the core network device.

8. The method according to claim 6, further comprising:
   obtaining, by the radio access network device, a second QoS parameter configuration from a second QoS parameter configuration function, and performing QoS parameter configuration on the service data based on the second QoS parameter configuration.

9. A radio access network device, comprising:
   a communications interface, configured to receive, in a service flow manner, service data transmitted by a core network device from a packet data network (PDN) network to a user equipment; and
   a processor, configured to map the service data to t bearers between the radio access network device and the user equipment according to a QoS rule, wherein t is an integer greater than or equal to 1, wherein
   the communications interface is further configured to transmit the service data mapped to the t bearers to the user equipment in a bearer manner through the t bearers.

10. The radio access network device according to claim 9, wherein the communications interface is further configured to obtain the QoS rule from a radio access network QoS controller or the core network device.

11. The radio access network device according to claim 9, wherein the processor is further configured to map the service data to the t bearers evenly.

12. The radio access network device according to claim 9, wherein the processor is further configured to map the service data to the t bearers unevenly.

13. The radio access network device according to claim 9, wherein:
the communications interface is further configured to obtain a second QoS parameter configuration from a second QoS parameter configuration function; and
the processor is further configured to perform QoS parameter configuration on the t bearers based on the second QoS parameter configuration.

14. A radio access network device, comprising:
a communications interface, configured to receive, through p bearers between a user equipment and the radio access network device, service data from the user equipment to a packet data network (PDN) network, wherein p is an integer greater than or equal to 1; and
a processor, configured to perform flow demapping of the p bearers according to a quality of service (QoS) rule, to obtain the service data from the p bearers; and
wherein the communications interface is further configured to transmit the service data obtained from the flow demapping to a core network device of the PDN network in a service flow manner.

15. The radio access network device according to claim 14, wherein the communications interface is further configured to obtain the QoS rule from a radio access network QoS controller or the core network device.

16. The radio access network device according to claim 14, wherein:
the communications interface is further configured to obtain a second QoS parameter configuration from a second QoS parameter configuration function; and
the processor is further configured to perform QoS parameter configuration on the service data based on the second QoS parameter configuration.

* * * * *